(12) United States Patent
Visel

(10) Patent No.: US 7,849,034 B2
(45) Date of Patent: Dec. 7, 2010

(54) METHOD OF EMULATING HUMAN COGNITION IN A BRAIN MODEL CONTAINING A PLURALITY OF ELECTRONICALLY REPRESENTED NEURONS

(75) Inventor: Thomas A. Visel, Austin, TX (US)

(73) Assignee: Neuric Technologies, LLC, Houston, TX (US)

( * ) Notice: Subject to any disclaimer, the term of this patent is extended or adjusted under 35 U.S.C. 154(b) by 837 days.

(21) Appl. No.: 11/425,688

(22) Filed: Jun. 21, 2006

(65) Prior Publication Data

US 2008/0300841 A1    Dec. 4, 2008

Related U.S. Application Data

(63) Continuation of application No. 11/154,313, filed on Jun. 16, 2005, now Pat. No. 7,089,218, which is a continuation of application No. 11/030,452, filed on Jan. 6, 2005, now abandoned.

(60) Provisional application No. 60/534,492, filed on Jan. 6, 2004, provisional application No. 60/534,659, filed on Jan. 6, 2004, provisional application No. 60/534,641, filed on Jan. 6, 2004.

(51) Int. Cl.
G06E 1/00 (2006.01)
G06E 3/00 (2006.01)
G06F 15/18 (2006.01)
G06G 7/00 (2006.01)

(52) U.S. Cl. ....................................................... 706/26
(58) Field of Classification Search ................... 706/18, 706/26
See application file for complete search history.

(56) References Cited

U.S. PATENT DOCUMENTS

| 4,884,972 | A |  | 12/1989 | Gasper |
| 5,371,807 | A |  | 12/1994 | Register et al. |
| 5,406,956 | A |  | 4/1995 | Farwell |
| 5,649,065 | A | * | 7/1997 | Lo et al. ........................ 706/22 |
| 5,918,222 | A |  | 6/1999 | Fukui et al. |
| 6,014,653 | A | * | 1/2000 | Thaler ........................ 706/16 |
| 6,081,774 | A |  | 6/2000 | de Hita et al. |
| 6,269,368 | B1 |  | 7/2001 | Diamond |
| 6,317,700 | B1 | * | 11/2001 | Bagne ........................ 702/181 |

(Continued)

FOREIGN PATENT DOCUMENTS

EP    1 006 452 A2    6/2002

OTHER PUBLICATIONS

McCallum, A.K. "Reinforcement Learning with Selective Perception and Hidden State" Dissertation, University of Rochester, Rochester, New York. 1996.*

(Continued)

Primary Examiner—Donald Sparks
Assistant Examiner—Benjamin Buss
(74) Attorney, Agent, or Firm—Howison & Arnott, L.L.P.

(57) ABSTRACT

A method of emulating the human brain with its thought and rationalization processes is presented here, as well as a method of storing human-like thought. The invention provides for inclusion of psychological profiles, experience and societal position in an electronic emulation of the human brain. This permits a realistic human-like response by that emulation to the people and the interactive environment around it.

8 Claims, 9 Drawing Sheets

U.S. PATENT DOCUMENTS

| | | | |
|---|---|---|---|
| 6,330,537 | B1 | 12/2001 | Davis et al. |
| 6,353,810 | B1 | 3/2002 | Petrushin |
| 6,415,257 | B1 | 7/2002 | Junqua et al. |
| 6,513,006 | B2 | 1/2003 | Howard et al. |
| 6,584,464 | B1 | 6/2003 | Warthen |
| 6,601,026 | B2 | 7/2003 | Appelt et al. |
| 6,611,841 | B1 | 8/2003 | Han |
| 6,629,242 | B2 | 9/2003 | Kamiya et al. |
| 6,731,307 | B1 | 5/2004 | Strubbe et al. |
| 6,795,808 | B1 | 9/2004 | Strubbe et al. |
| 6,826,568 | B2 | 11/2004 | Bernstein et al. |
| 6,842,877 | B2 | 1/2005 | Robarts et al. |
| 6,901,390 | B2 | 5/2005 | Mizokawa |
| 7,113,848 | B2 | 9/2006 | Hanson |
| 7,249,117 | B2 * | 7/2007 | Estes .......................... 706/18 |
| 7,363,108 | B2 | 4/2008 | Noda et al. |
| 7,379,568 | B2 | 5/2008 | Movellan et al. |
| 2001/0001318 | A1 | 5/2001 | Kamiya et al. |
| 2002/0087346 | A1 | 7/2002 | Harkey |
| 2003/0055654 | A1 | 3/2003 | Oudeyer |
| 2003/0093280 | A1 | 5/2003 | Oudeyer |
| 2003/0101151 | A1 | 5/2003 | Holland |
| 2003/0103053 | A1 | 6/2003 | Stephany et al. |
| 2003/0110026 | A1 | 6/2003 | Yamamoto |
| 2003/0115165 | A1 | 6/2003 | Hoya |
| 2003/0130837 | A1 | 7/2003 | Batchilo et al. |
| 2003/0182123 | A1 | 9/2003 | Mitsuyoshi |
| 2003/0234871 | A1 | 12/2003 | Squilla et al. |
| 2004/0006566 | A1 * | 1/2004 | Taylor et al. ................ 707/100 |
| 2004/0039483 | A1 | 2/2004 | Kemp et al. |
| 2004/0054636 | A1 | 3/2004 | Tango-Lowy |
| 2004/0138959 | A1 | 7/2004 | Hlavac et al. |
| 2004/0139040 | A1 * | 7/2004 | Nervegna et al. ............. 706/15 |
| 2004/0175680 | A1 | 9/2004 | Hlavac et al. |
| 2004/0181427 | A1 | 9/2004 | Stobbs et al. |
| 2004/0186743 | A1 | 9/2004 | Cordero, Jr. |
| 2004/0189702 | A1 | 9/2004 | Hlavac et al. |
| 2004/0193420 | A1 | 9/2004 | Kennewick et al. |
| 2004/0205035 | A1 * | 10/2004 | Rimoux ....................... 706/14 |
| 2004/0243281 | A1 | 12/2004 | Fujita et al. |
| 2004/0243529 | A1 | 12/2004 | Stoneman |
| 2004/0243568 | A1 | 12/2004 | Wang et al. |
| 2004/0249510 | A1 | 12/2004 | Hanson |
| 2005/0062743 | A1 | 3/2005 | Marschner et al. |
| 2005/0090935 | A1 | 4/2005 | Sabe et al. |
| 2005/0102246 | A1 | 5/2005 | Movellan et al. |
| 2005/0143138 | A1 | 6/2005 | Lee et al. |
| 2005/0216121 | A1 | 9/2005 | Sawada et al. |
| 2007/0156625 | A1 | 7/2007 | Visel |

OTHER PUBLICATIONS

Witkowski, C.M. "Schemes for Learning and Behavior: A New Expectancy Model" Dissertation, University of London. Feb. 1997.*

Halici, U. "Reinforcement learning in random neural networks for cascaded decisions" BioSystems 40. Elsevier. 1997.*

Lehmann, T. et al. "On-chip Learning in Pulsed Silicon Neural Networks" 1997 IEEE International Symposium on Circuits and Systems, Hong Kong. Jun. 9-12, 1997.*

"International Search Report," International Searching Authority of the Patent Cooperation Treaty, PCT Application No. PCT/US06/00229, May 12, 2006, p. 1.

PCT: International Search Report and Written Opinion of PCT/US2008/072243 (related application); Feb. 27, 2009; 7 pgs.

PCT: International Preliminary Report on Patentability of PCT/US2008/072243 (related application); Feb. 9, 2010; 5 pgs.

Barba, R. The Sims: Prima's Official Strategy Guide. Prima Publishing, Roseville, CA. 2000.

Breazeal, C. and Aryananda, L. 2002. Recognition of Affective Communicative Intent in Robot-Directed Speech. Autonomous Robots 12, 1 (Jan. 2002), 83-104.

Breazeal, C. 1998, "A motivational system for regulating human-robot in- teraction," in Proceedings of the Fifteenth National Conference on Artificial Intelligence (AAA198), Madison, WI, pp. 54-61. Jul. 26-30, 1998.

Breazeal, C., Scassellati, B., How to build robots that make friends and influence people. Intelligent Robots and Systems, 1999. IROS '99. Proceedings. 1999 IEEE/RSJ International Conference on. vol. 2, Oct. 17-21, 1999 pp. 858-863 vol. 2.

Breazeal, C. and Scassellati, B. 1999. A Context-Dependent Attention System for a Social Robot. In Proceedings of the Sixteenth international Joint Conference on Artificial Intelligence (Jul. 31-Aug. 6, 1999). T. Dean, Ed. Morgan Kaufmann Publishers, San Francisco, CA, 1146-1153.

Breazeal, C. and Scassellati, B. 2000. Infant-like social interactions between a robot and a human caregiver. Adapt. Behav. 8, 1 (Jan. 2000), 49-74.

Fong, T., Nourbakhsh, I., Dautenhahn, K. A survey of socially interactive robots: concepts, design and applications, Technical Report No. CMU-RI-TR-02-29, Robotics Institute, Carnegie Mellon University, 2002.

Ushida, H., Hirayama, Y., and Nakajima, H. 1998. Emotion model for life-like agent and its evaluation. In Proceedings of the Fifteenth National/Tenth Conference on Artificial intelligence/innovative Applications of Artificial intelligence (Madison, Wisconsin, United States). American Association for Artificial Intelligence, Menlo Park, CA, 62-69.

Pantic, Maja et al., "Toward an affect-sensitive multimodal human-computer interaction." In Proceedings of the IEEE, vol. 91, Issue 9, p. 1370-139, Sep. 2003 [retrieved on Oct. 12, 2007]. Retrieved from the Internet: <URL:http://http://www.kbs.twi.tudelft.nl/docs/journal/Pantic.M-ProcIEEE2003.pdf>.

* cited by examiner

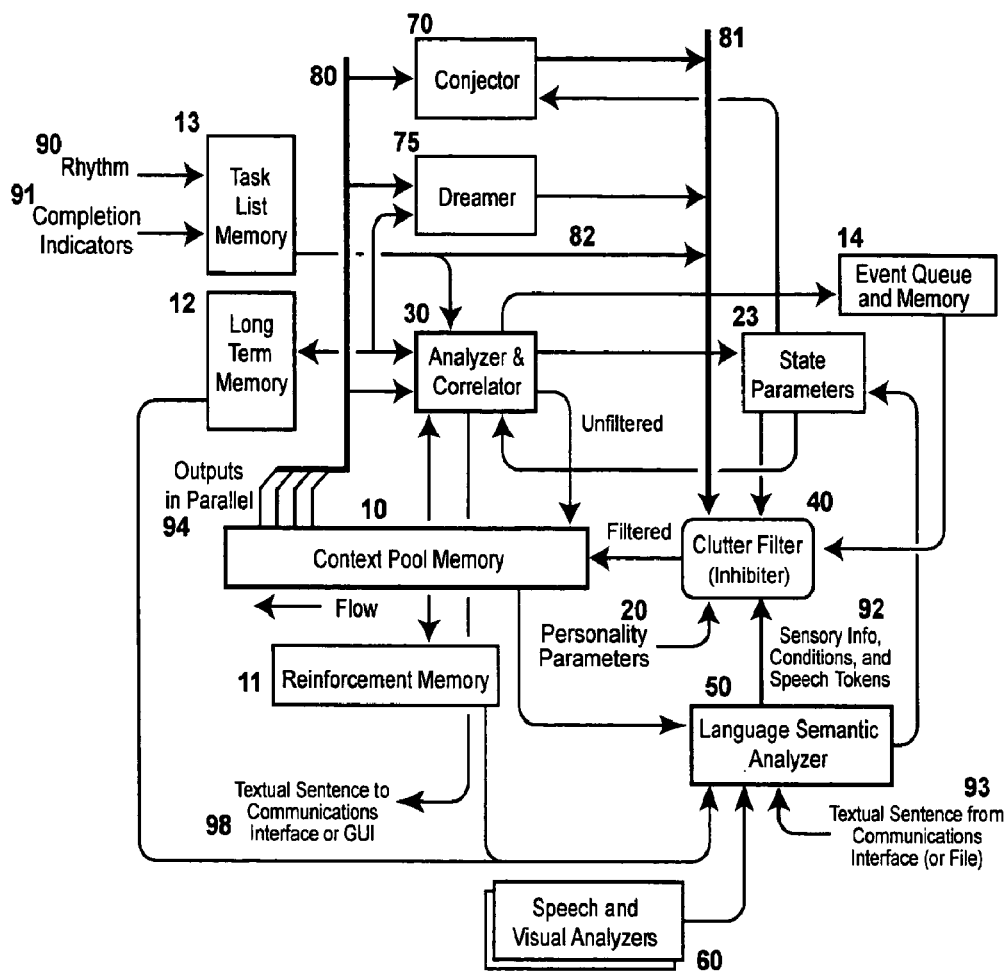

Figure 4

```
/** *** Overall Sentence ***
 *   Order of tests is important. */
      Sentence  = {Quest_To_Learn | Imper_Sentence | Exclam_Sentence
                  | Decl_Sentence | Quest_To_Confirm};

/*  *** Declarative Sentence ***
 *   Indicators: Subject is before the verb, is spoken w/falling
 *   intonation, and ends in '.'
 *   Hearer responds w/acknowledgment (yes, okay, <nod>). */
      Decl_Sentence = go Has_Decl '.';
      Decl_Phrase   = Ind_Clause [{Coord_Conj | ';'} Ind_Clause] . Has_Decl;
      Ind_Clause    = Subject Predicate;
      Predicate     = Not_End [Adverb] {Tv_Sentence | Iv_Sentence
                      | Lv_Sentence} [Compounder];

Compounder    = Not_End [','] Adv_Sub_Conj Decl_Phrase;

/*  ** Sentence w/linking verb - Describe or identify a condition (of being) ***/
      Lv_Sentence   = Lv {Subj_Compl | Adv_Phrase | Adjective};

```
1. the table failed.
Sentence                                    'the table failed.'
  Declarative                               'the table failed.'
    Ind_Clause                              'the table failed.'
      Subj                                  'the table failed.'
        Noun_Ph                             'the table failed.'
          Not_End                           'the table failed.'
          Pronoun                           'the table failed.'
          Norm_Noun_Ph                      'the table failed.'
            Noun_Prefix                     'the table failed.'
              Article                       'the table failed.'
                Def_Art                     'the table failed.'
                Def_Art matched 'the'
              Article matched 'the'
            Noun_Prefix matched 'the'
            Noun_Equiv                      ' table failed.'
            Noun_Equiv matched 'table'
          Norm_Noun_Ph matched 'the table'
        Noun_Ph matched 'the table'
      Subj matched 'the table'
      Pred                                  ' failed.'
        Classify_MV                         ' failed.'
          Verb_Wo_Cdx                       ' failed.'
            Past                            ' failed.'
              Past_Verb                     ' failed.'
              Past_Verb matched 'failed'
            Past matched 'failed'
          Verb_Wo_Cdx matched 'failed'
        Classify_MV matched 'failed'
      Pred matched 'failed'
    Ind_Clause matched 'the table failed'
  Declarative matched 'the table failed'
Sentence matched 'the table failed.'
```

Figure 6

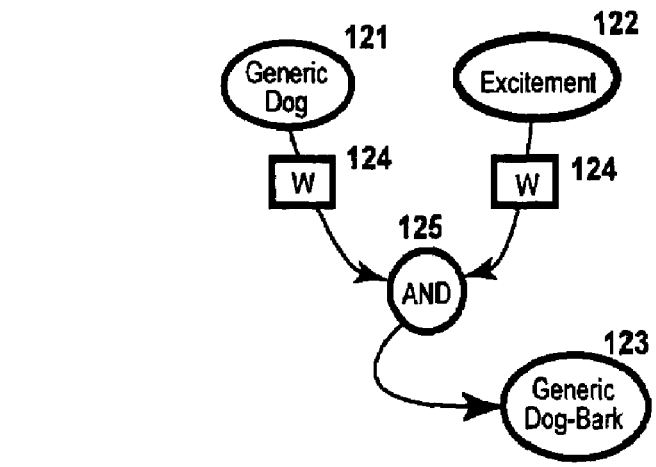

Figure 7

METHOD OF EMULATING HUMAN COGNITION IN A BRAIN MODEL CONTAINING A PLURALITY OF ELECTRONICALLY REPRESENTED NEURONS

CROSS REFERENCE TO RELATED APPLICATIONS

This is a continuation application of pending U.S. Ser. No. 11/154,313, filed Jun. 16, 2005, now U.S. Pat. No. 7,089,218, entitled METHOD FOR INCLUSION OF PSYCHOLOGICAL TEMPERAMENT IN AN ELECTRONIC EMULATION OF THE HUMAN BRAIN, which is a continuation of U.S. Ser. No. 11/030,452, filed on Jan. 6, 2005, now abandoned, entitled METHOD FOR INCLUSION OF PSYCHOLOGICAL TEMPERAMENT IN AN ELECTRONIC EMULATION OF THE HUMAN BRAIN, which claims the benefit of Provisional Applications, Ser. Nos. 60/534,641, 60/534,492, and 60/534,659, filed Jan. 6, 2004.

TECHNICAL FIELD OF THE INVENTION

The present invention pertains in general to artificial intelligence and, more particularly, to the modeling of temperament and personality.

ADVANTAGES OF THE INVENTION

This invention provides a well-defined and simplified way to model human-like thought, emotional, behavioral, cognitive and conjectural processes, and an alternative to the colder and impersonal behaviors of traditional models for Artificial Intelligence (AI). The methods of this invention are compatible with many traditional approaches to AI, but are based on models of temperament and personality. Together they are a cohesive system of processing and memory to accurately emulate human thought, decisions and behavior.

BACKGROUND OF THE INVENTION

In previous decades, various methods have been proposed and constructed to emulate human-like behavior, many which were bio-mimetic. That is, they were suggested by the underlying human biological elements of the human brain. While these have been successful in part, they have failed to permit accurate emulation of the brain on a large scale. Some bio-inspired concepts such as fuzzy logic have made relatively few inroads into commercial markets. Fuzzy logic and rules-based applications have been very niche-like and limited, although within those niches, fuzzy logic has performed quite well. Neither have proven amenable to implementation on brain-level scales, however.

Throughout this document, "brain emulation" and "brain model" have been used interchangeably as needed to best convey intent.

Some approaches of a prior system have depended upon bio-inspired neural networks, such as shown in FIG. 1.

In a neural network, for example, a set of neurons 1 and 2 are assumed to be stimulated by some external means 95, each neuron typically representing a fact. It fires in proportion to the present state of recognition of that fact. They may be connected to other neurons 3 and 4, with the connections implying a specific relationship between them. Interposed in the connections between the neurons may be a set of weights 5 which control the influence of the 'input' neurons 1 and 2 over the 'output' neurons 3.

Finally, various forms of control such as inhibitors may be implemented, such as for neuron 4. In this case, the firing on neuron 2 may inhibit the influence of upper neuron 13 upon output neuron 4, as indicated by inhibitor 6. The implementation may either be within neuron 4 or may precede it. The organization and interconnect of the network dictates that certain present input conditions 95 will yield the desired output results 96.

Another popular form of a prior system involves the use of a system of rules, such as depicted in FIG. 2. In this case, a set of input conditions 95 are acted upon by a set of rules 7, to produce a set of pre-defined desired output results 96. The rules translate the set of input conditions into a set of signals that depicts the desired results. A set of feedback paths 97 are further compared with the inputs 95 to modify the rules 7, permitting the outputs 96 to converge on the desired results. These are typically referred to as "first principles" systems.

While rules-based systems tend to produce the desired results, they can be very complex and require enormous amounts of computing power. Many hundreds of thousands of rules may be generated, and the results are not always accurate. Typical applications such as text-to-speech that use rules-based mechanisms do not have good accuracies unless extensive operator-specific training is used. Inaccurate results and excessive computational power have prevented pervasive applications of rules-based systems.

SUMMARY OF THE INVENTION

This invention incorporates temperament, emotion, feeling, personality and prior experiences to accurately emulate a human's thought and decision processes. Without these, it is highly unlikely that any system or neural network can accurately emulate real human beings.

Certain assumptions are made by any underlying model of the human brain, including this one, to enable or simplify the understanding and implementation of brain function. Such a model may suggest specific approaches to implementation. However, its accuracy to the original biological elements of the brain or to precise psychological behavior does not necessarily affect the claims of the present invention.

In considering an emulation of the human brain, certain structures or elements might be imagined which may have no (or only passing) equivalence to a biological counterpart, but which greatly simplify the emulation. One such set of elements is the Brain Parameter, or parameter, as used throughout this patent. Parameters are controlling elements that define the present emotional and mental process state of the brain. Such parameters are used here to define states, conditions, moods and other matters of import, and are similar in electronic hardware to I/O ports, or in software to state variables.

Unlike other approaches to the emulation of human thought, this invention readily permits the influence of cultural, religious and political views and beliefs that are unique to the personality being emulated.

This invention is bio-mimetic in that the concept of learning, and of interpreting new information, takes place in the context of the moment. To mimic this and other functions of memory processes in the human brain, a number of special dedicated memories and lists are used.

A context pool memory holds present situational context and is the center for analytic and thought processes of this invention. It is the context pool for the moment. A reinforcement memory holds propositions, 'facts' and experiential relationships that have yet to be reaffirmed. Information that has been reaffirmed over a (typically) 21-day interval is committed to permanent memory, the long term memory. Finally, specialized list memory is maintained for use with motor skills, particularly to time-dependent or repetitive tasks.

The remainder of the invention is composed of various working blocks that implement certain functions of the brain. The analyzer/correlator implements basic thought processes, handles the vagaries of emotion and implements a system of deference that places the pseudo-person within the context of social, political and religious structure. Use of an event queue and memory simplifies the analytical and control functions.

The primary language of implementation is English, but almost any human language of choice may also be used with the same methods and internal structures. To 'bootstrap' the learning processes, the invention also includes a grammatical and lexical parser for English sentences and sentence fragments.

The invention is capable of being trained using English prose to establish vocabulary, specific sets of experiences, knowledge for specific areas of expertise, and factors effecting both temperament and personality.

Multiple instances of this invention can be used as a collection of emulated people in communication, for example, through an electronic or optical network. It is also suitable for controlling an external mechanical skeleton or other robotic mechanics. Finally, it is suitable for use as one in a set of trained electronic 'people' who comprise the trained crew, for example, in an Unmanned Arial Vehicle (UAV).

BRIEF DESCRIPTION OF THE DRAWINGS

For a more complete understanding of the present invention and the advantages thereof, reference is now made to the following description taken in conjunction with the accompanying Drawings in which:

FIG. 4 illustrates Implementation of the Brain Emulation—Block diagram of brain emulation;

FIG. 5 illustrates Language Grammar Sample—Example of natural language grammar description;

FIG. 6 illustrates Example Parser Diagnostic Trace—Example trace of grammar parsing;

FIG. 7 illustrates Example Relationals Between Neurons;

DETAILED DESCRIPTION OF THE INVENTION

Figure 1:
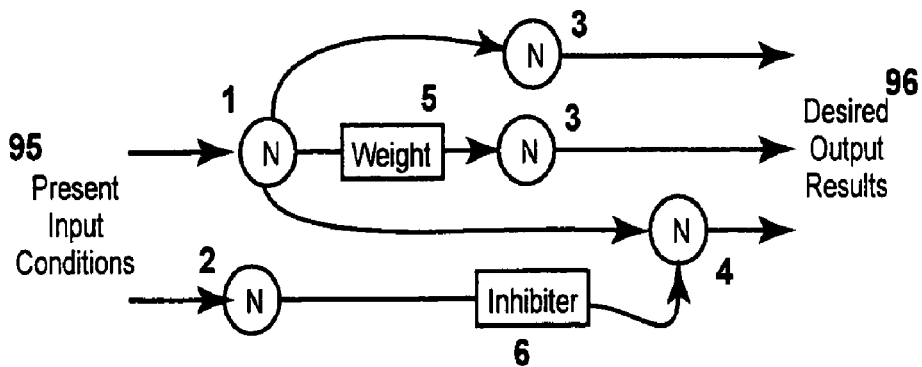
FIG. 1 illustrates Traditional Neural Networks (Prior Art)

The system of the present disclosure distills the temperament, personality and instantaneous state of a human individual into a series of Brain Parameters. Each of these has a value varying from zero to 100 percent, and is loosely equivalent to a single neuron. These parameters collectively define the state of the person's being and specify matters of temperament and personality. Some parameters are fixed and seldom if ever change, while others change dynamically with present conditions.

Relationships between parameters, if any, are pre-established. The Parameters are connected with the rest of the brain model in such a manner as to alter the decision processes, decision thresholds and the implied personal interests of the underlying model they become a part of.

The exact list of Parameters and their definitions are not germane to the system of the present disclosure, and may include more or fewer parameters in any given implementation thereof. Numerous parameters define certain tendencies specific to certain temperaments. Some define the present emotional state, such as sense of confidence in a decision. Others are place-holders that define such things as the present topic of conversation or who the first, second or third persons in the conversation are. Yet others define physical parameters such as orientation within the environment, sense of direction, timing and the like.

Some brain Parameters may be loosely arranged in a hierarchical fashion, while others are not, such that altering any one parameter may affect others lower in the hierarchy. This arrangement simplifies the implementation of personality.

Example Parameters. Table 1 illustrates a few of several hundred such parameters by way of example. The 'Choleric' parameter, 202 for example, is 'above' others in the hierarchy, in that altering the percentage of Choleric temperament affects the value of many other parameters. For example, it affects the Propensity to Decide 222. Each can be treated as a neuron that may be interconnected with other (non-parameter) neurons. The parameter neurons may serve in a role similar to an I/O port in a digital computer.

The below table is not a complete set of parameters, but is a representative set of parameters useful for the explanations that follow.

TABLE 1

General Examples of Brain Parameters

| | Parameter | Description |
|---|---|---|
| 201 | Root Temperament | Choleric, Melancholy, Sanguine or Phlegmatic |
| 202 | Choleric, Ratiometric | Percentage contribution of Choleric attributes |

TABLE 1-continued

General Examples of Brain Parameters

| | Parameter | Description |
|---|---|---|
| 203 | Melancholy, Ratiometric | Percentage contribution of Melancholy attributes |
| 204 | Sanguine, Ratiometric | Percentage contribution of Sanguine attributes |
| 204 | Phlegmatic, Ratiometric | Percentage Contribution of Phlegmatic attributes |
| 209 | Gender | Male or female |
| | Sense of Confidence (Decisions) | Degree of confidence in a decision |
| | Sense of Confidence (Motor Skills) | Degree of confidence in present motor skill |
| | Sense of Determination | Degree of determination to continue present plan |
| | Sense of Dread | Present sense of dread being experienced |
| | Sense of Enjoyment | Present sense of enjoyment |
| | Sense of Embarrassment | Present sense of embarrassment |
| 229 | Present need to Defer | Present need to defer to external person's desire |
| 230 | Trauma | State of physical or emotional trauma |
| | Present Goal (1 of n) | Present objective(s), a list |
| | Long Term Goal (1 of n) | Long term objective(s), a list |
| | Topic of conversation (1 of n) | The present subject of conversation, a list |
| | Self Identify | Recognition of identity such as target for communications |
| | Present Speaker | Identity of person speaking |
| | Person Spoken To | Identity of person being spoken to |
| | Present Object | Identity of object/person being spoken of |
| 235 | Correlating Facts, status | True of presently correlating information |
| 236 | Hottest Node, status | Hottest-firing node in context pool, for threshold scaling |
| 237 | Activity Threshold | Minimum firing level for context pool memory |

In traditional models of the human brain, facts are simplistically represented as a single neuron, each of which may 'fire' at some level of 0 . . . 100%. The degree of firing is construed as an indication of the present recognition of that fact. These neurons are interconnected by weighted links, based upon the relationship and experience between connected neurons.

Example Decision-Related State Parameters. Some of the key state parameters used in the decision process are detailed below. Some are set by personality traits, some by the context of the moment and are described elsewhere. Several have baseline values established by the Propensity to parameters.

Activity Threshold 237 is the minimum percentage of full-scale that a neuron must fire before it is considered a candidate for inclusion in short-term memory.

Base Decision Threshold 250 is a personality-based starting basis for the decision threshold. Long-term training and learning experience can raise or lower the base value.

Correlating Facts 235 is true if the correlator portion of the analyzer is presently correlating facts, usually in support of an analyzer decision.

Hottest Node 236 points to the hottest-firing neuron in the context pool (short-term memory). The analyzer uses it for scaling decision thresholds.

Importance for Action 215 is the relative importance of making a decision. It is initially based on the propensity for importance of action, and can be scaled up down by the analyzer as the result of recent decisions.

Need for Completeness 260 indicates the relative need for complete (and quality) facts, prior to making a decision. Incomplete facts will cause the Conjector to make suitable guesses, but the resulting 'facts' will be of lower quality.

Urgency for Action 216 represents the urgency (not the importance) of making a decision. Higher levels of urgency make lower quality of information (and decisions) acceptable.

Example Temperament-Based Propensity Parameters. A typical set of basic brain Parameters which indicate various propensities based upon temperament are given in Table 2, including representative contribution ratios (given as a percentage). This set of values is by no means complete and is given for the sake of description of the mechanisms of this invention. Other Temperament Parameters may be identified and included in this list, without altering the methods and claims of this patent.

The specific percentages given in Table 2 are representative and typical values used, but are subject to 'tweaking' to improve the accuracy of the psychological model. Other values may be used in the actual implementation. Further, the list is representative and is not complete, but serves to demonstrate the system of the present disclosure.

It has been observed (and incorporated into Table 2) that, generally, many of these parameters reflect traits shared primarily by two of the temperaments, with one of the two being greater. That same parameter may also be shared minimally by the remaining two temperaments.

TABLE 2

Examples of Temperament Parameters

| | Parameter | Choleric | Melancholy | Sanguine | Phlegmatic |
|---|---|---|---|---|---|
| 210 | Propensity for Amusement | 10 | 35 | 35 | 20 |
| 211 | Propensity for Completeness | 20 | 35 | 10 | 35 |
| 212 | Propensity for Determination | 35 | 20 | 10 | 35 |

TABLE 2-continued

Examples of Temperament Parameters

| | Parameter | Choleric | Melancholy | Sanguine | Phlegmatic |
|---|---|---|---|---|---|
| 213 | Propensity for Enjoyment | 10 | 25 | 40 | 25 |
| 214 | Propensity for Fun | 10 | 20 | 55 | 15 |
| 215 | Propensity for Importance of Action | 50 | 10 | 35 | 5 |
| 216 | Propensity for Urgency of Action | 35 | 12 | 50 | 3 |
| 217 | Propensity for Patience | 15 | 35 | 5 | 45 |
| 218 | Propensity for Rhythm Influence | 10 | 15 | 60 | 15 |
| 219 | Propensity for Stability | 10 | 25 | 5 | 60 |
| 220 | Propensity to Analyze | 10 | 60 | 5 | 25 |
| 221 | Propensity to Care-Take | 5 | 10 | 30 | 55 |
| 222 | Propensity to Decide Quickly | 50 | 15 | 30 | 5 |
| 223 | Propensity to Follow a Plan | 10 | 25 | 5 | 60 |
| 224 | Propensity to Plan | 50 | 35 | 10 | 5 |
| 225 | Propensity to Procrastinate | 5 | 15 | 30 | 50 |
| 226 | Propensity to Second-Guess | 5 | 60 | 10 | 25 |
| 227 | Propensity for Stability of Action | 10 | 25 | 5 | 60 |
| 228 | Propensity to Rest Hands on Hips or in Pockets | 25 | 60 | 5 | 10 |

The system of the present disclosure presumes the use of a node that defines the desired underlying temperament, and additional nodes that define the desired percentages of the four temperaments. Table 2 is a chart of the selected typical tendencies for each of the temperaments, with each numeric value giving the approximate likelihood of the given trait to be demonstrated by the four temperaments, as a percentage.

The percentages given are by way of example, although they may approximate realistic values. The altering of these values by no means alters the means and methods of this patent, and they may be adjusted to better approximate temperament traits. The list is by no means complete and is given as a set of representative parameters for sake of example.

In many, but not all, cases, the overall impact of a temperament is given by the product of the temperament's percentage, as pre-selected to produce the desired personality, and the percentage of likelihood given for each propensity from Table 2. This is demonstrated in FIGS. 4 and 5. These may be augmented by additional variations due to the Gender 201 parameter, accounting for differences in response by male or female gender.

Detail of Some Temperament-Based Propensity Parameters. The samplings of parameters in Table 2 are described below, by way of example of how such parameters are specified and applied. The described settings and applications of these parameters are necessarily subjective, and the relative weightings of these and all other parameters described in this document are approximate and exemplary. One skilled in the art will realize that they may be altered or adjusted without altering the means of the system of the present disclosure.

The Propensity for Amusement 210 is the tendency to be amused. The higher values lower the threshold of what is found to be amusing, triggering amusement sooner. The triggering of amusement may be reflected in the appropriate facial expressions, as provided for in the underlying brain model and skeletal mechanics, if any.

The Propensity for Completeness 211 is a measure of the personality's tendency to need complete facts before making a decision, and is based solely on temperament selection. It is naturally highest for the Melancholy and naturally lowest for the Sanguine or Choleric. While it is normally not altered, the underlying brain model (analyzer) can raise or lower this parameter based upon training or learning.

The Propensity for Determination 212 is the tendency for the brain emulation to be determined, and sets the baseline value for the sense of determination. Over time, it can be permanently altered by achievement (or failure to achieve) targets or goals.

The Propensity for Enjoyment 213 is a measure of the tendency to find enjoyment in issues of life. It is naturally moderately higher for the Sanguine, and is impacted (either way) with a very long time constant (20 days) by the achievement of goals, the completion of plans, and by positive relationship experiences.

The Propensity for Fun 214 defines the tendency of the temperament to make decisions based on the sense of feel-good. It is temperament dependent, tends to be highest for the Sanguine, and heavily influences the impact of Rhythm Influence.

The Propensity for Importance of Action 215 is a measure of the temperament's tendency to find action important, whether or not all the facts needed for decision are available and with high confidence. It is naturally highest for the Choleric and naturally lowest for the Melancholy and Phlegmatic. While it is normally not altered, the underlying brain emulation can raise or lower this parameter based upon training or learning.

The Propensity for Urgency of Action 216 is a measure of the personality's tendency to find action important, at the expense of strong consideration or analysis of the facts. It is naturally highest for the Sanguine and naturally lowest for the Phlegmatic. While it is normally not altered, the underlying brain emulation can raise or lower this parameter based upon training or learning.

The Propensity for Patience 217 is a measure of the overall tendency for patience. The level is normally high for a Phlegmatic and low for a Sanguine, but is also significantly affected by (long term) experience history. Growth is in this trait parameter is very slow and is an iterative process. High levels of Patience 217 cause suppress early termination of action, when faced with repeated failure to meet short- or long-term goals.

The Propensity for Rhythm Influence 28 is a temperament-dependent parameter, and may be altered up or downward by hyperactivity. It controls the relative effect of rhythm on the decision process. Its baseline value is relatively higher for the Sanguine.

The Propensity for Stability 219 is a temperament-dependent parameter that defines the tendency towards stability. When the value is high, decisions will tend to be made that lead to no net change, in the sense of foot-dragging. It also implies a tendency to procrastinate, and is a strength (or weakness) of the Phlegmatic personality. High levels of Stability 219 lead to strong loyalty towards the context-dependent authority.

The Propensity to Analyze 220 (is determined by temperament and is not affected by other properties, except by external command. Even then, its effect is short term and is rapidly trends back to the base tendency. When very high, there is a marked tendency to analyze and correlate facts before making decisions, and the confidence-based decision thresholds based on the outcome are normally raised.

The Propensity to Care-Take 221 is a temperament-dependent parameter, tending highest in the Phlegmatic and Sanguine. It increases the interest in acquiring people-related facts for short-term memory. The impact of this parameter is established, for example, by altering the parameters of the Clutter Filter for the context pool or short term memory.

The Propensity to Decide 222 is a parameter that is highest for the Choleric and Sanguine temperaments, and influences (increases) the willingness to make decisions with a minimum of facts. For the Choleric, decisions subsequently proven inferior may be altered, while for the Sanguine, the results tend to be ignored. Parameter 222 also increases the tendency to revise decisions as higher-quality facts are available, and decreases the stability in decisions and the tendency to foot-drag.

The Propensity to Follow the Plan 223 defines is the (current) level of tendency to follow a plan. Its core value comes from personality traits, but is altered by such variables as stress, urgency, and external pressure. When pressure is high, as per Trauma parameter 230, there is increased tendency to ignore the plan and to revert to personality profile-based responses. This is accomplished in a manner such as demonstrated, for example, in FIG. 5.

The Propensity to Plan 224 is a measure of the tendency and desire to work out a plan prior to a project or task, and is a function of the temperament profile. If Propensity 34 is high, work on the task will be suspended until a plan of steps in the task is worked out. The propensity to plan does not imply a propensity to follow the plan, per 223.

The Propensity to Procrastinate 225 is a measure of the tendency to procrastinate, deferring decisions and action. The primary value derives from the temperament per Table 2, and is and is then a fixed parameter but which may be gradually altered by experience or training. While procrastination is largely a characteristic of the Phlegmatic, it also occurs in the Melancholy decision-making process, in the absence of complete facts, and is normally very low for the Choleric.

The Propensity to Second-Guess 226 is a measure of the tendency to reevaluate decisions, even quality decisions, and possibly to evaluate them yet again. Temperament-dependent as shown in Table 2, it is highest in the Melancholy and typically lowest in the Choleric.

The Propensity to Stability of Action 227 is a measure of the tendency to maintain the status quo. Largely a Phlegmatic trait, it influences (increases) the tendency to foot-drag, and is implemented by a decreased willingness to alter plans. It may be connected to the underlying brain emulation or model as a part of the clutter or interest filter at the input of the context pool, short term memory or analyzer, suppressing new plans or suggestions that abort existing or active plans.

Propensity to Rest Hands on Hips 228 is a largely Melancholy trait whose more positive values increases the tendency of any attached mechanical skeleton to find a resting place for its hands, primarily on the hips or in the pockets. This parameter provides a control value to the underlying brain emulation or model, which itself is responsible for the motor skill issues that carry out this tendency. That emulation or model actually determines whether or not this tendency is carried out.

Again, parameters in Table 2 are directly controlled by one or more of the four underlying temperament selection parameters. They are scaled by percentages such as those also given by example in Table 2. They are then distributed by the brain model to the appropriate control points, filters and selectors within the underlying brain emulation or model.

Figure 3:
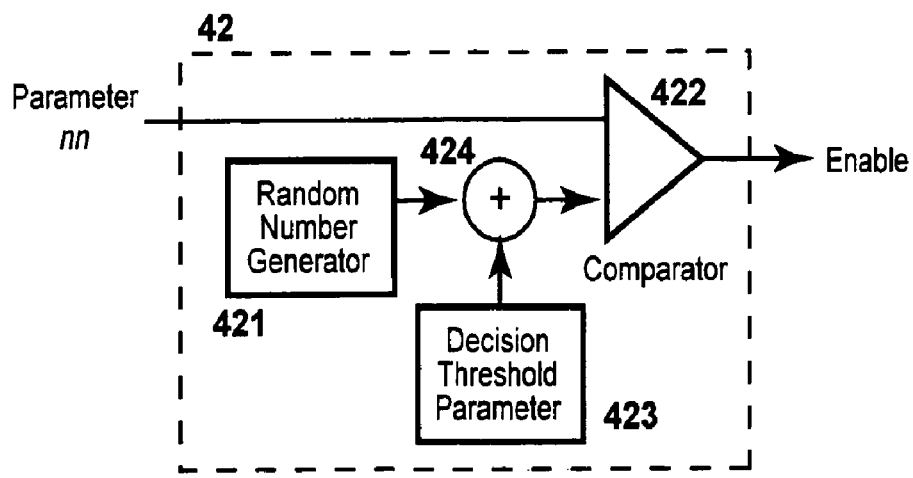
FIG. 3 illustrates Influence Inclusion—An example of weighted random influence.

Inclusion of Parameter Influence. Throughout the brain emulation, there are many places at which a parameter may or may-not influence the outcome of a decision. The likelihood of the parameter contributing to the decision in some cases are often statistically based. One method of accomplishing this is shown in FIG. 3. A random number between 0 and 100% is generated by 421 and is compared by 422 against the parameter in question. If the parameter value exceeds the sum of a base threshold parameter 423 and a random number, inclusion is enabled.

This type of logic is frequently used in the clutter filter discussed elsewhere.

Derived Brain Parameters. Many parameters derive from the basic Temperament Parameters of Table 2. These values may be a combination of temperament parameters, but as adjusted for learning, training, experience and present conditions. As with other brain nodes and parameters, most of these are expressed in a range of 0 . . . 100%, in units suitable to the technology of implementation.

A typical set of these derived parameters is given in Table 3. Each of these has an additional (signed) value to be added to it which is further adjusted on the basis of learning or training. The list is by no means complete, and is given for the sake of description of the mechanisms of this invention. Many of these relate to matters of emotion, its measure and expression. These, as may all parameters, may be monitored externally to measure the emotional state of the emulated brain.

TABLE 3

Examples of Derived Brain Parameters

| | Derived Parameter | Decay Targets | | | |
| --- | --- | --- | --- | --- | --- |
| | | Choleric | Melancholy | Sanguine | Phlegmatic |
| 250 | Base Decision Threshold | 10 | 45 | 5 | 40 |
| 251 | Concentration Ability | 10 | 60 | 5 | 25 |

TABLE 3-continued

Examples of Derived Brain Parameters

| | | Decay Targets | | | |
|---|---|---|---|---|---|
| | Derived Parameter | Choleric | Melancholy | Sanguine | Phlegmatic |
| 252 | Docility | 5 | 25 | 10 | 60 |
| 253 | Hyperactivity | 25 | 10 | 60 | 5 |
| 255 | Filter Organizational Detail | 5 | 25 | 10 | 60 |
| 256 | Filter People Interest | 60 | 25 | 5 | 10 |
| 258 | Filter Relational Detail | 10 | 60 | 5 | 25 |
| 259 | Filter Technical Detail | 45 | 5 | 40 | 10 |
| 260 | Need for Completeness | 10 | 40 | 5 | 45 |
| 261 | Patience With Detail | 5 | 60 | 10 | 25 |
| 262 | Procrastination Level | 5 | 25 | 10 | 60 |

These parameters may be derived from temperament, context, environmental and current-condition parameters, for example, although other means will become obvious during this discussion. The parameters of Table 3 are exemplary. Most parameters in this table decay over time to the values shown at the right. These decay targets are nominal and may be altered through preemptive training. They derive from temperament percentages in a similar manner to for Table 2. The list is by no means exhaustive or complete, and others will also become obvious during this discussion The current derived parameter values are distributed to the appropriate control points, filters and selectors within the brain emulation or model. In some cases, they control decision or stability thresholds, or establish the statistical settings, such as per 42 of FIG. 3, for current-interest filters in the emulated brain, and to other such brain emulation functions. The composite impact of these temperament and temperament-derived parameters determines the composite personality of the emulated brain.

The Base Decision Threshold parameter 250 is the starting basis for many decisions. It is the typical starting decision threshold, and is a measure of confidence or information completeness that must be obtained before a decision will be made. The threshold is given as a percentage, 0 . . . 100%, whose application depends upon the types of decisions being made. In some places it is used as an absolute threshold, or may specify a figure of confidence in the present facts, a figure that must be exceeded before a decision may be made.

The Concentration Ability parameter 251 is a measure of the ability to concentrate. A more positive value raises the threshold of attention to outside distractions, those unrelated to the issues in short term (or current context) memory in the underlying brain model or emulation. It is used by both the analyzer 30 and the clutter filter 40.

Docility 252 is a measure of the overall propensity for stability during external emotional pressure. It contains a long-term filter that decays back to the base value. Positive Docility 252 greatly increases the threshold of attention to emotional trigger events. Docility 252 can be altered over moderate periods of time, but tends to return to its temperament-defined static value. When this value falls lower than its average setting, there is an increasing tendency to ignore learned responses and to revert to personality profile-based responses.

Hyperactivity 253 is a measure of current levels of hyperactivity, as would be normally defined by someone skilled in the art. It is established by a programmable value and subsequently augmented by temperament percentages. Hyperactivity is also influenced by Docility 252 and current emotional stress. These sources are the primary determiners for the base value of hyperactivity, but long-term training or experience can alter the value. Choleric and Sanguine temperaments have relatively higher values, while Melancholy and Phlegmatic values are quite low.

The impact of Hyperactivity 253 is implemented, for example, by introduction of (typically negative) random variations in the magnitude of selected decision thresholds. It also alters the time constants of task-step performance and present rhythm parameters, with additional ultimate impact upon the performance of motor tasks.

Filter Organizational Detail 255 specifies the filtering of organizational detail from incoming information, context pool or short-term memory for the brain emulation. A value below 100% removes the greatest percentage of detail.

Filter Human Interest 256 specifies the filtering of human-interest data from the incoming information, context pool or short-term memory in the emulated brain. 100% removes most human-interest information. The value will be highest for Choleric models and lowest for Sanguine temperaments.

Filter Relational Detail 258 specifies the filtering of detail about inter-relationships between facts from the incoming information, context pool or short-term memory. 100% removes most detail. The value is highest for Phlegmatic and Sanguine models and lowest for the Melancholy models. Higher levels inhibit the correlation of distant facts that are nonetheless related. Lower levels encourage also encourage the analyzer 30 to spawn events to event memory 14. This has the effect of iteratively revisiting the same information to analyze short-term memory for better correlation of data.

Filter Technical Detail 259 specifies the filtering of technical detail from the incoming information, context pool or short-term memory for the brain emulation. 100% removes most detail. The value is highest for Choleric and Sanguine models, and lowest for Melancholy models.

The Need for Completeness parameter 260 establishes the required level of completeness of information before making a decision. A higher value of completeness increases the likelihood of deferring a decision until all the facts are available, sometimes stymieing or stalling a decision. Other parameters related to importance and urgency can alter this parameter. The need for completeness can be altered by a decision of the analyzer 30, and upon external command to the brain emulation, such as through 93.

As the context pool (short-term memory) shrinks over time because of rest, the need 260 drifts backwards to the value set by the propensity for completeness. The need also reverts to the propensity value after a decision has been made. 100% implies the highest need for completeness. It is highest for Melancholy and lowest for Choleric and Sanguine models.

Patience With Detail 261 is the present level of patience. Its baseline value derives from the propensity for patience. It is affected by present conditions and can be commanded to rise. It largely alters decision thresholds, and values near 100% imply comfort with detail. The value is dynamic and tends highest for the Melancholy and lowest for Sanguine and Choleric.

Procrastination Level 262 is a measure of the present level of procrastination. Its base value is set by the propensity to procrastinate, is increased by uncertainty, and decreased by impatience. Procrastination defers decisions and postpones actions that are not otherwise inhibited by circumstances. Decision choices are implemented in a manner similar to 42 of FIG. 3. Higher values of this level postpone decisions, even in the presence of hard facts (high sense of certainty).

While procrastination is largely a characteristic of the Phlegmatic, it also occurs in the Melancholy decision-making process in the absence of complete facts. It is normally very low for the Choleric.

As noted, the parameters described in the preceding tables in no way constitute a complete set of obvious ones, which total in the hundreds. Selected parameters have been presented by way of illustrating the internal processes and considerations for the brain emulation of the present invention.

Implementation of the Brain Emulation. One implementation of the underlying functional model of the brain is diagrammed in FIG. 4. Three primary elements of the model are analyzer/correlator 30, the context pool memory 10, and the English semantic analyzer 50.

Throughout the descriptions, English is always used where the processing of external communications are involved, whether in complete sentences or in sentence fragments. Internally, the system is essentially language independent, except where linguistics, phonics, the spelling of words or the shape of letters used in the language are involved. For ease of initial implementation, English was used, but essentially identical processes can be applied to any human language of choice. The choice of language in no way limits the invention for purposes of this patent. Indeed, the methods of this patent can be applied to autonomously translate one human language to another.

Referring to FIG. 4, various elements are controlled or modified by the state parameters previously discussed. In particular, the Clutter Filter 40 plays a central role in determining what types of information are actually considered in the brain. As are most other blocks in the figure, operation of the analyzer/correlator 30 is controlled or heavily influenced by personality state parameters 22. These same parameters may themselves by the results of analyzer 30, in many cases.

The flow of external information enters through the semantic analyzer 50. This distills content and intent from both English sentences and sentence fragments, and formats the distillate for inclusion into short-term memory 10.

Concept of the Neuron Used Here. This invention makes no attempt to replicate the biological neuron, axion and dendron, their arrangement or interconnections, or their redundancy. Rather, the term neuron in this patent describes the means to remember a single fact or experience. As suggested bio-mimetically, the existence of a single fact is represented simplistically by a single neuron, while the implications of that fact are contained in the arrangement of interconnects between neurons.

In the biological neuron, there is an in-place 'firing' of a neuron when the associated fact is recognized. When, for example in a fox's brain, a specific neuron represents a common rabbit, the firing of a biological neuron implies recognition of that rabbit. The degree of firing (or output) represents the degree of certainty with which the rabbit is recognized.

There is no such equivalent in-place firing of the neuron in the emulation or brain model of this invention. In a digital implementation, the entire long-term memory 12 (where facts, relationships and experiences are stored) could be composed of read-only or slow flash memory, because recognition does not involve a change of the neuron's state in that memory.

As an alternative process used here, recognition takes place by the existence, recognition or correlation of data within the context pool memory 10. Any reference to a 'firing neuron' is to be construed as placement of a reference to (address-of) that neuron into context pool 10, along with a current firing level for it.

Figure 9:
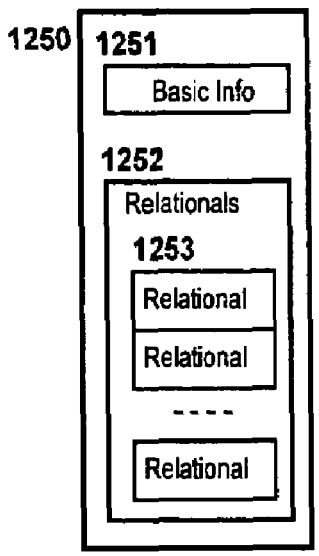
FIG. 9 illustrates Table of Neurons—Internal organization of a neuron.

Neurons and Reference Indices. Every neuron records two types of information. The existence of a specific fact is implied by the fact that a neuron to represent that was defined at all. Experiences are implied by the relationships and linkages formed between neurons. Individual neurons are emulated by some fixed-size base information, and a variable number of relational connection records, as shown in FIG. 9. Relational conditions may be conditional, predicated upon the state of other neurons, and reference the ID indices of both their target neurons and condition triggers.

All neurons have a unique address, but it may be change from time to time as memory is reorganized. Further, the very existence of some neurons is tentative. They may disappear unless reinforced over a period of time, and are located in the reinforcement memory 11. Because their precise locations are unstable, references of one neuron by another could be problematic. Further, the relative size of a neuron can vary widely, depending upon the inter-relationships and context with other neurons.

To handle these matters gracefully, a unique and unchanging index is allocated for each neuron created. References between neurons use this permanent index to inter-reference each other. If a neuron is deleted (in reinforcement memory 11), the index is reclaimed for later reuse. A specific bit within the index value indicates whether it refers to a normal permanent neuron or to the reinforcement memory 11. A fixed subset of the indices to the reinforcement memory 'tentative' neurons are also be reserved, used to indicate information block type and format within the context pool 10.

Neurons in the reinforcement memory 11 that have been reinforced over a period of time are made permanent by the analyzer/correlator 30. The analyzer then moves them to permanent memory 12 and alters all references to its index to show that it has been so moved. References within that neuron may themselves not survive the reinforcement process, and may be deleted during the transfer. Refer to Table 4 for data stored with the individual neuron.

Content of Neural Reference Structures. The analyzer/correlator repeatedly scans context pool memory 10 for both unprocessed information and for activities suspended while awaiting occurrence of certain events or conditions. It also updates brain parameters both to keep them current and to check for relevant changes of substance.

Within the context pool, information is organized into variable-sized blocks, with all of it pre-classified or typed prior to submission. Some blocks contain inferred intent from sentences. Others contain commands, propositions, conjecture and other miscellaneous material. In its degenerate form, a 'block' may simply be a reference to a single neuron, and its firing level.

TABLE 4

Neuron Structural Content

| Neural Content | Description |
| --- | --- |
| Basic Information | Basic information may include references to explicit spellings (e.g., a walk-back index to the text-tree for the word), pronunciation exceptions, visual-object descriptors and the like. Certain flags and start-indices for lexical matters and the like are also included here. |
| Relational Linkages | The weighted and conditional influence of this neuron upon another is defined by relational linkages, of which there may be up to 1000 or more, for some neurons. Each new experience and relationship learned has a relational linkage created for it.<br>Initially, these relationships are created in the reinforcement memory, where they remain until later validated and moved to long-term memory (or are deleted). Relationals in reinforcement memory may refer to neurons in either memory, but those in long-term memory may refer only to other neurons in long-term memory.<br>The Analyzer tracks the allocation, aging, validation, and 'garbage-collection' processes, and these are discussed in detail elsewhere. |

Individual neurons are emulated by some fixed-size base information, and a variable number of relational connection records. The latter may be conditional, predicated upon the state of other neurons, and reference the ID indices of both their target and conditional neurons.

Context PoolMemory 10. The core of all emulation occurs in the context pool (short term) memory 10 and the analyzer/correlator 30. All information of immediate awareness to the emulator resides in that context pool. Neuron-like firing is implied by the very existence within the context pool of a reference to a neuron from long-term memory 12. Information (blocks) enter the context pool serially, as it were, but are processed in parallel by the analyzer 30.

Referring the context pool 10 in FIG. 4, data flows from right to left, as it were. Unless reinforced, all neuron data in the pool gradually 'leaks away' or dies away during its travel, aging it. Should the context pool fill, oldest (or left-most) data is simply lost, a case of information overload. Any data remaining in the context pool that has aged without reinforcement can eventually decay to a zero-firing state, at which point it is simply removed from the pool.

Data may be placed into the context pool from a number of sources, the initial one of which is often the semantic analyzer 50. Except for inputs from the analyzer 30, all context pool information is filtered by a clutter filter 40, which largely keeps irrelevant or non-interesting data from reaching the context pool.

Data in the context pool take the of form block-like structures of predefined format. A block arriving from the semantic analyzer 50, for example, contains the intent of a sentence, independent clause or sentence fragment. A one-word reply to a question is fully meaningful as such a fragment. Such a sentence block may contain references to a speaker, the person spoken to, and possibly, references to the person or object discussed. Many combinations of this and other sentence data are possible.

Blocks from analyzer 50 frequently includes the purpose of the sentence, such as query (and expected type of answer), command, factual declarations, observations and the like. This type of data is discrete and readily identifiable by the semantic parse.

Other implied emotional information may be inferred from use of superlatives, exclamatories, and tone (if derived from an auditory analyzer 60). Auditory sources yield the speaker's nominal fundamental frequency and infer stress or emotional excitement by short or long-term pitch deviations accompanying spoken speech.

The length of the context pool is determined empirically by the application, but is nominally sufficient to handle a number of hours of intense study, or approximately a day of casual interaction. To put sizes into context, this represents roughly a megabyte of conventional digital storage, although selected size does not alter the means or methods of this patent. During sleep times (or emulated extended rest), the context pool 10 gradually drains, with neural firings gradually fading to zero. As neural references fade to zero, they are removed from the context pool, as suggested bio-mimetically.

New information may be introduced during sleep by the dreamer block 75. Dreamer-derived information created during deep sleep decays rapidly when awake, at rates different from normal context pool data decay. If the sleep time is insufficient, yet-active neural firings remain into the following wake cycle, and are handled as previously described.

Language Syntax Analyzer 50. A language semantic analyzer 50 accepts communications in the natural language of implementation, English, for example. It breaks down sentences, clauses, and phrases to derive intent and purpose from the sentence. It uses the context of the current conversation or interaction by polling the analyzer 30, long-term memory 12 and reinforcement memory 11. Access to present context is obtained indirectly from the context pool via analyzer 30. Interpretation of language words is weighted by the presence of their associated neurons in the context pool, yielding context-accurate interpretations.

While language semantic analyzer 50 could be hard-coded in logic, it is beneficial for many applications that it be implemented as an embedded processor. This method is not required for the purposes of this invention, but is a convenience for the parse and interpretation of languages other than the initial design language.

Because all humans are essentially the same regardless of their national language and its grammar or semantics, the parameters described herein remain constant, while semantic analyzer language 50 language description script would change.

For convenience, statements emitted by analyzer 30 through interface 98 are created in analyzer 30. However, this function could be separated into a separate unit for convenience in altering the language of choice from English.

For a given language, semantic analyzer 50 recognizes a set of words that are an essentially invariant part of the language, such as with and for, in English. These play a substantial role in defining the grammar for the language. Nouns, verbs and adjectives readily change with the ages, but the fundamental structural words that make up the underlying grammar rarely do.

In addition to these invariant 'grammar' words, the structure of sentences, clauses and phrases define the remainder of the grammar. Analyzer 50 uses this overall grammar to interpret the intent of the communications.

Computer languages (non-natural languages) are often parsed by separate lexical and grammar parsers, using such commercial tools as Lex and Yacc. These were deemed burdensome and unwieldy for parses within the system of the present disclosure. For natural languages, an alternative parser (Lingua, a commercial parser and not the subject of this invention) was created. Using Lingua, a highly complete description of English grammar was defined and serves as the basis for language semantic analyzer 50. The intellectual property contained therein is a definition of English grammar itself, although it is also not the subject of this invention.

In the prior art, custom analyzers using large corpuses or dictionaries of words have also been employed for the parsing of English text. Unlike them, semantic analyzer 50 makes use of context-dependent information for a more accurate rendering of intent from the text.

Semantic analyzer 50 takes in natural language sentences, clauses, phrases and words, and emits blocks of decoded neuron references and inferred intent. In large measure, the non-changing and fundamental grammar words are discarded after they have served their purpose in the parsing. Similarly, structural constructs within sentences are often discarded after their implications have been gleaned. Finally, pronoun references such as he and it are replaced by references to neurons representing the resolution targets, such as "David Hempstead" or "rabbit".

The semantic analyzer indirectly references both long term 12 and the "21-day" reinforcement memory 11, and can extract relational information from either, to determine meaning and intent of specific words. It places greater weight on words whose neural references are already firing within the context pool 10.

The definitions of English (or other natural language) grammar are contained in a definition file in a variant of the Backus-Naur Format (BNF). Refer to FIG. 5 for an example fragment of such a definition. The example was implemented using the Lingua compiler, a commercial product of Neuric Technologies. An example of diagnostic results obtained from parsing the sentence, "The table failed." is given in FIG. 6, showing the iterative nature of the parser used in the commercial Lingua product.

It can readily be seen by one skilled in the art that the language analyzer 50 can be implemented variously without detracting from its placement and efficacy in the system of the present disclosure.

Sentence Blocks. For sentence processing, context pool 10 data may be blocked into inferred facts and data. Preprocessing in semantic analyzer 50 will have already converted sentence fragments into complete sentences, or will have flagged the fragments for expansion by the Conjector.

Each sentence block is usually a complete sentence, with subject and predicate. Implied you subjects have had the subject resolved and appropriate neuron reference substituted. The implied It is prefix, which turns a noun clause (e.g., an answer to a question) into a full sentence, would also have been added as needed. All sentence blocks are standardized in form, with inferred sentence information reordered into that form.

The blocks are of variable length, with flags that indicate the sentence data being stored. Some of this information is gleaned from state parameters. The sentence type dictates which items are optional. Types include Declaration, Question, Exclamation, Observation, Accusation, Answer to Query, and yet others. Other sentence data may include the following (and other) information:

Subject
Subject Person: (1st, 2nd or 3rd)
Subject Count: (Singular, Plural)
Subject Gender: (Male, Female, Object)
Action or Step to Take
Verb
Object (including Person, Count, Gender)
Target of Action (including Person, Count, Gender)

All noun-like items also contain the person, count, and gender flags. These sentence blocks are interpreted by the analyzer/correlator 30 and the conjector 70 as commands for interpretation. Some of these are described in the discussion about Table 7 contents.

The Sentence Recognition Process. Regardless of whether the sentence was obtained through written text or from auditory speech, recognition and understanding of sentence content is roughly the same. The greatest differences are the additional cross-checks, validations, and filters imposed on spoken speech. For extracting intent from sentences, a general communications triad is defined: The speaker, the person/object spoken to (e.g., the receiver of commands), and the person, object or subject spoken of. Most of this information can be inferred from sentence content, from the present context pool 10, and from state parameters 20 and 23.

The basic process is:

1. Parse—Parse the sentence using language grammar rules, such as in FIG. 5.

2. Extract the Triad Corners—Identify shifts in the communications triad, if any. For identified shifts, advise correlator 30 by suitable command notifier in the context pool 10.

3. Extract any Qualifiers—Compile qualifier clauses. If a definitive sentence, store the compilation, but otherwise evaluate the clause's probability to a single neuron, extracting both neuron references and data sufficient to create additional relational connections 1252.

4. Extract Structural Elements Extract key structural elements, discarding semantic information. Store the data in appropriate blocks or neuron references for use by the correlators 30 and 75.

5. Compile Definitives—Compile any definitive sentences into relational and qualifier constituents, storing the relational associations (if any) with the relevant fact neurons. This is done indirectly by submitting an appropriate directive to the context pool 10.

The above basic process is exemplary of a portion of the typical activity for parsing a sentence and generating information or command blocks for inclusion in the context pool 10.

Clutter Filter 40. Clutter filter 40 acts to limit entry of certain types of information into context pool 10. Information entering the context pool must pass through the clutter filter, except for that emitted by analyzer 30. The purpose of the filter is to remove extraneous neurons, such as language or grammatical tokens and non-significant gesture information. The clutter filter follows preset heuristics which may either be fixed or adaptable.

The result of the filter is to maximize the consideration of relevant information and to minimize 'mental clutter' and things of little interest to the personality being modeled. Choleric temperaments, for example, do not thrive on human-interest information as the Sanguine does. Data so identified may be removed in keeping with current parameter conditions. This may occur during the course of conversational exchange, during which time semantic analyzer 50 or other sources flags the data on the basis of the topic of discussion.

The clutter filter is a substantial contributor to the emulation differences in right-brained and left-brained activity, second in this only to the work of analyzer/correlator 30.

During interaction with the outside world, a large number of neurons are referenced from memory and submitted to the context pool 10 for analysis, correlation, conjecture and dreaming. The filter considers the type and groupings of neurons being submitted, as well as some of the inhibitor factors, and may opt to discard them instead forwarding them to the context pool 10. During normal (non-sleep) activity, outputs from the dreamer 75 are given very low priority, unless overall levels of neural firings in the context pool 10 are very low.

Neural phrase results from the analyzer 30 always enter short-term memory directly, bypassing the clutter filter. By the nature, analyzer/correlator governs overall thought (and memory) processes and normally does not produce clutter.

The filter also prioritizes incoming information. Entire contents of answers to questions are also likely to be passed through, whereas the same material might not ordinarily be.

The primary basis of determination of what constitutes 'clutter' is the personality parameters 20, a subset of the state parameters 22. (In FIG. 4, they are shown separately from other parameters for emphasis and clarity, but are essentially are the same.) Logic such as that of FIG. 3 demonstrates one means by which the clutter determination may be made. It will be obvious to one skilled in the art that the clutter filter as described here can be augmented with additional rules and heuristics without altering the basic inventions of this patent.

Analyzer/Correlator 30 The analyzer/correlator 30 is the heart of the emulated brain, and is the primary center of activity for thought processes. It is also the primary means for updating of all dynamic brain parameters and is the only means for initiating permanent storage of information.

Decisions are normally based upon 'solid' facts, information of high confidence or firings. Generally speaking, higher perceived quality of the source information yields higher quality decisions. In the absence of good information, analyzer 30 uses information from conjector 70, although results using the latter are also of lower quality.

Thought and decision processes are performed by the analyzer block, with supporting prompts and suggestions from conjector 70 and dreamer 75 blocks. The heart of the analyzer's work is done in context pool memory 10, such that all processes are performed within the context of the moment.

Entry of a neuron reference into the context pool memory 10 initiates a sequence of events unique to the neuron and its associated relational (experiential) linkages, or 'relationals'. Detailed later, these often make use of the event queue memory 14 to handle the implications of their connections.

Initial Activity Upon Awakening. When awakened in the morning, the rested mind (that is, the context pool 10) is usually quite empty. Thoughts and cares of the past day are gone, or are so diminished as to not be readily recalled. Fragments of sentences, fleeting observations and incomplete or illogical ideas of the previous day have been purged, the mind uncluttered. This is the context upon awakening.

Daily activity in this brain emulation begins in a similar way. The initial tendency is to resort to routine, established lists of actions, usually by the timed fulfillment of events from the event queue 14. Activity can also be started by other external means in both human life and in this brain emulation. Table 5 lists some example ways that activity begins in the morning, but the list is of course by no means inclusive:

TABLE 5

Example Start-of-Day Activity Indicators

| Event | Activity Initiated |
| --- | --- |
| Hungry for Breakfast | For the human, some form of routine that is normally undertaken, even if only the process of waking up, getting dressed and eating breakfast. Such a simple process is still a learned list, equivalent to one stored in the task list memory 13, though it also may not be consciously present in the mind. If nothing else occurs during the initial state of fogginess, the physical body soon makes known its need for food, and that initiates a tentative routine. If the emulated brain is connected to a robotic skeleton or vehicle, an equivalent for hunger might be depletion of fuel or electrical charge. |
| Conversation or Telephone Call | Sometimes the day is begun by someone else who interrupts the sleep with a request for attention, asking a question. This is equivalent to wake-up via external communications 93, or through speech or visual analyzer 90. The sequence initiated by the conversation is a part of the thought processes. The sentence may be a command, a question or an observation. |
| Uncompleted List | Lists of things to be done at the close of the previous day are not always purged by sleep. They remain part of active context 10 of the brain. Carried into the next day with reduced clarity or importance, they are a basis for the first thoughts of the day. Timed or conditional items emitted to the event queue 14 may also be waiting. |

Any of the above conditions places blocks of neuron references that take the form of sentences, event-based commands and other information to be processed. One skilled in the art will recognize that the analyzer/correlator 10 can be implemented as hard-coded logic, a form of command interpreter, or as an embedded processor without altering the means of this invention.

Outcomes of Analyzer/Correlator Activity. As a consequence of its operation, analyzer/correlator 10 may include any of the activities of Table 6. The list is indicative of the types of outcomes and is not all-inclusive, but may be extended for the convenience of implementation. One skilled in the art shall realize that this does not alter the means of this patent.

text pool commands are encoded as dedicated lower values of neural indices. The commands are variable in length, with their index followed by length and supporting information.

Many synthesized commands derive from the parsing of sentences by language analyzer 50. Sentences may be dis-

TABLE 6

Outcomes of Analyzer Activity

| Action | Description |
| --- | --- |
| Fire a Neural Reference | In context pool 10, initiate (or increase) the firing of a neuron for each new reference to it. Multiple references in the context pool 10 to the same neuron thus increase its influence. |
| Reinforce Neural 'Keep' Count | Neurons in t reinforcement memory 11 that have been freshly referenced are reinforced. Their time-weighted reference ('keep') count is maintained with the neuron in memory 11. |
| Decay 21-day References | Periodically (e.g., during sleep intervals) decay the 'keep' count for all neurons in the reinforcement memory 11, to enforce the need for reinforcement of learned information. |
| Create a Permanent Neuron | Neurons in reinforcement memory 11 that have satisfied their reference count level are made permanent by moving them to long-term memory 12, updating their references, and removing them from short term memory. |
| Initiate an Event | Certain conditions, particularly due to neuron relationals, and some types of sentences, cause events to be queued to the event memory 14. The queuing is normally for execution after specified delay, awaiting the meeting of the conditions pending. |
| Ask a Question | Based upon need for more information, ask a question, formatting and emitting it through interface 98. |
| Perform I/O or Motor Skills | Initiate appropriate motor skill lists or handle computer-like I/O related to the application. |
| Update a State Parameter | Update relevant state parameters 20 based upon changes in internal conditions created by analyzer 30. |
| Trigger Other Neural Blocks | Initiate action in other blocks such as the task list memory 13, to initiate motor-skill activity or to perform memorized steps. |
| Decayed-Neuron Removal | When firing value for a neural reference in context pool 10 has been decayed to zero, remove the reference from the context pool. |
| Neural Reference Aging | Periodically throughout the active day, neural references in context pool 10 are aged, reducing their influence. This aging is accelerated during periods of sleep. |
| Conjecture Clutter Removal | Commands or references created by the conjector 70 are correlated for relevance, and discarded for low relevance to the target subject(s). |
| Dream Clutter Removal | While awake, information and command fragments from dreamer 75 are rapidly decayed. During sleep periods, perceived accuracy of these items is increased and treated as ordinary and factual information, but motor-skill related commands are suppressed. |
| Expand Fragment | Command the conjector 70 to expand a sentence fragment into the closest equivalent full sentence. |

Besides the items of Table 6, analyzer/correlator 30 maintains and updates numerous lists, such as present subjects of conversation or inquiry, the status of pending answers to questions issued, maintenance and completion status of motor skill activity, and the like. Its primary source of information and commands comes from the present contents of the context pool 10.

Context Pool Commands. Within context pool 10, information and facts are stored in the generic form as neuron references, neural indices. Both state parameters 20 and contilled into multiple commands, each complete with neural references. Implied subjects, verbs or objects are resolved with references to relevant neurons. For sentences with multiple subjects, verbs or objects, the sentence content is replicated, with one copy per item in the subject list, for example.

Some commands found in context pool 10 are given in Table 7. The list is exemplary and not exhaustive. One skilled in the art will realize that the list may be extended without altering the means of the system of the present disclosure.

TABLE 7

Example of Context Pool Commands

| Command | Remarks |
| --- | --- |
| Initiate Motor Skill | From a command or a list item |
| Await Completion | Suspend topic activity, awaiting completion. |
| Await Factual Answer | Question was asked that expects factual information. |
| Await Affirmative Answer | Question was asked that expects a yes/no answer. |
| Seek Information | Ask a question to resolve ambiguity or missing information. |

TABLE 7-continued

Example of Context Pool Commands

| | Command | Remarks |
|---|---|---|
| | Correlate Answer | Process anticipated answer |
| | Initiate Definition | From definitive sentence |
| | Execute Command | From imperative sentence |
| | Repeat Until Condition | Perform an iterative operation or analysis. |
| | Note Declarative | Handle declarative sentence or observation, setting relevant expectations. |
| | Note Exclamatory | Handle exclamatory sentence, updating relevant emotional states. |
| | Update/Add Topic | Refresh list of topics and update relevance of the list items. |
| | Update the Communications Triad | Update the list(s) of who is speaking (speaker), who is being spoken to (target) and the object(s) of conversation. |
| | Note Accusation | Handle accusatory statements, updating emotional state and emitting conditional events to queue 14 to prep answers to implied questions. |
| 231 | Declarative | Command to handle state of being, remarks or commentary |
| 232 | Imperative | Command to self to do something |
| 233 | Definitive | Command to define something |
| 234 | Interrogative | Command to respond to a question |

For convenience, all data structures in the context pool look like neuron references.

Execution commands are always flagged by their source, such as a speech or grammar analyzer, the Analyzer or Correlator, the Conjector, Dreamer and so on. The Analyzer later considers the source when applying the command during its thought or decision processes. Exemplary commands from semantic analyzer 50 are given below, these particular ones being based upon sentence types.

Declarative 231 This is an instruction to consider a present condition about the subject. It may also be a part of an experience process, ultimately culminating in the creation of a neuron-to-neuron or neuron-to-state-parameter relationships. This command is usually created by the parsing of a sentence, but can also be created by thought processes within analyzer 30.

Declaratives may result in a remembered relationship, in time and with reaffirmation, and through conjector 70's action. That is, declaratives are 'taken with a grain of salt', and consider confidence in the source of the observation. They differ from the definitive 233 in that the latter is already presumed to be a source of facts, and only the reliability of (confidence in) the information needs to be confirmed before remembering it.

For example, "Four cats are sufficient to eliminate mice from large barns," is a declarative that proposes how many cats it takes to get the job done. Before analyzer 30 assumes the statement to be factual and remembers it, it will consider its confidence in the source of the remark, and whether or not the information is reaffirmed.

Imperative 232 instructs analyzer 30 to the brain emulation to do something, such as to consider a proposal, pay attention, recall something, or to conjecture an answer to an issue with insufficient information. It is a command for action of some type, directed towards the brain emulation.

A command such as 'Come here!' must be evaluated in the present context. It implies activation of a motor-skill list to begin physical motion, and targets the location of the speaker. The latter may not be in the context pool, but is maintained in a state parameter. In this case, analyzer 30 directs the motor skill via task list 13. It can then, for example, issue an await-on-completion event 142 and dismiss the command from memory. It will later receive a completion message (or a notation that it encountered a brick wall or other impediment to carrying out the instruction), closing the command.

Definitive 233 indicates definition of a fact (in reinforcement memory 11), and may include auxiliary conditional relational information. Example, "A cat is an animal with have four paws, of which the front two are commonly called for paws," is a compound statement. The statements share a common subject, and have separate definitive 233 ("A cat is an animal with four paws") and declarative 231 ("The front cat paws are commonly called for paws") clauses. Semantic analyzer 50 separates the compound into separate commands for each clause.

Declarative 231 portion, "A cat is an animal with four paws," defines these neurons if they are not already known: Cat, Animal and Paws. Even if the meanings of Animal or Paws are unknown, they can still be remembered, and the suitable relationals later formed between them. These are all recorded in reinforcement memory 11, if not already there and not known in long-term memory.

If already in reinforcement memory 11, their existence is reaffirmed to encourage possible permanent recollection. If the veracity of the speaker is high, less time is required to reinforce the facts. If the system is in preemptive training mode, these are assumed to be pristine facts, perhaps from God, and are immediately and permanently remembered.

The declarative 231 portion, "The front (cat) paws are commonly called forepaws," also forms a definition, but must be reaffirmed to a greater degree than for the definitive clause. (Because parsing has already been performed, the explicit subject defined at the start of the sentence has already been associated with the trailing clause, too, by semantic analyzer 50.)

Because 'The' is present, the clause is declarative 231 rather than definitive 233. This is because the reference is to a specific cat, rather than to the generic cat animal. One skilled in the art is aware of these subtleties of English grammar, and how that grammar may be used to determine the intention and type of sentence.

Interrogative 234 poses questions and requests. These are normally injected into context pool 10 by the grammar semantic parser 50, but may also be queries from other sources. Many (but not all) questions are simply a declarative statement with a question indicated, and are often formed by a restructuring of a simple declarative sentence.

The parser 50 sorts questions into those seeking affirmation (yes/no) or seeking specific information, and presents them to the context memory as declaratives 231 marked for validation or as an imperative 234 demanding an informative response. In either case, analyzer 30 only sees data constructs for the latter forms, and so marked as questions so that it can form its response to the question.

Other internal commands are also added for sake of convenience, analyzer 30 loosely taking on the form of a von Neumann processor, with the 'program' being the command stream from the English parser, or from other blocks.

In communicating with brain emulators that share common memory 12, their analyzer 30 can forward 'digested' command blocks directly to the context pool of this emulator. If communicating with the outside world via external interface 98, analyzer 30 reformats the command block into an English sentence for parsing there, and receives English back via interface 93.

Neurons and the Context Pool. Conditionals expect a specific neuron (or combination of neurons) to be fired. State parameters 20 and 23 are pseudo-neurons, and preexist all allocated neurons. They are treated as neurons, and are assigned the lowest index ID numbers, but have no relational (experiential) links created for them. The ID of every firing neuron (except for state parameters), along with some information specific to the neuron, is maintained in the context pool, including the degree of firing.

Aged neurons in context pool 10 that are no longer firing are eliminated from the pool memory, usually while 'sleeping'. Neurons yet firing but are not being reaffirmed or re-fired in the context pool have no effect, other than to establish the context of the moment. For example, they may be the subject of a conditional test, or may alter the contextual meaning of a sentence being parsed.

Figure 10:
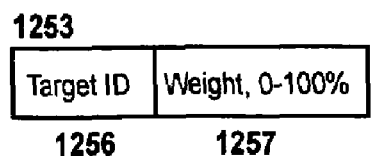
FIG. 10 illustrates Example Relational Record—Contents of inter-neuron relationship record.

Unidirectional Relationals. Where relationships are unidirectional, a relational attached to the 'causing' neuron issues an event, but only if the specified condition is true. For unidirectional relationships, A implies B, but B does not imply A. In either case, the relationships may be conditional, predicated on other neurons also firing. Referring to FIG. 10, a relational link 1253 is created within the neuron impacted by the relationship.

Bidirectional Relationals. Where relationships are bidirectional, neurons or state parameters at both ends of the relational will issue events. If any conditions specified are not met, no event is fired off. For bidirectional relationships, A implies B, and B implies A. In either case, the relationships may be conditional, predicated on other neurons also firing. Referring to FIG. 10, a relational link 1253 is created within the both neurons in the relationship, each referring to the other.

Relationals that Emit Events. When a neuron initially fires (or is reaffirmed), analyzer 30 scans its list of attached relationals. They are organized as AND-connected lists optionally separated by OR markers. Consecutive relationals are evaluated until one of them fails or until an OR marker is encountered. If a relational fails, subsequent relationals are ignored, to the next OR mark or end of the list.

On failure, encountering an OR marker resets the failure condition, the OR is ignored, and testing resumes at the relational just beyond the OR.

If the end-of-list is found first after a failure, no event is generated. Finding an OR (or finding an end-If-list, with all previous tests successful) implies that all AND-connected relational conditions were met, so an event is created. Conditional relationals may be flagged with a NOT, implying that the converse of the condition must be true for the relational to succeed.

Other Internal Lists. Analyzer/correlator 30 maintains other lists of information in short-term memory similar to that of the state parameters 22, which are also treated as blocks of predefined neurons. These have been discussed elsewhere within this patent and include list such as the following:

Topics of Discussion
Motor Activities in Process
Events whose completion is being awaited
Multiple objects to apply sentence to
Multiple verbs applying to the sentence One skilled in the art will recognize that the above list is by no means inclusive, and the logical or physical placement of the above lists may be altered, or the list added to, without changing the methods of this patent.

Walking the Neural Connection. When a new command is added to the context pool 10, it usually contains a reference to a neuron that represents a fact or condition of existence. Usually it will reference more than one. Each such reference either brings the neuron 'into the pool' also, or reaffirms neurons already in the context pool.

Simply referencing a neuron causes analyzer 30 to bring it into the context pool, even if not firing very strongly. Some command blocks, such as from a definitive clause, greatly increase the level of firing. Multiple references to the same neuron over relatively short duration, increases the firing level, also, up to the 100% level.

Recognition of a person's face, for example, brings the ID of that person into the context pool, firing the relevant neuron in accordance with the degree of confidence in the recognition. (e.g., "That might be Jackie, over there.") Shortly thereafter, hearing the same person's voice increases the confidence of the identification. The firing of that person's neuron (ID) may therefore increase from perhaps 65% to 95%. Ongoing interaction with that person keeps his ID alive in the context pool.

Correlation of Relational Information. When in-pool neurons fire, other neurons may be implied by known relationships. For example, Green and Animal might imply a parrot if either Cage or South America is presently in the context pool. Otherwise, if Swamp is firing, Alligator may fire. Analyzer/correlator 30 gathers triggered references into context pool 10, updating neuron firings in a manner specified by the scaled connection weight.

For the case of such relationally-initiated firings, firing level is controlled by the values of the referencing neurons (e.g, Green, Animal or Swamp), and the weight given in the relational connections. That is, the Alligator neuron will fire weakly if Florida (which might imply Swamp) is firing weakly, although nothing else directly activated Swamp. Analyzer 30 effectively acts as a correlator by walking through the connections of all firing neurons, awakening other neurons as long as firings are not suppressed by conditional relationships.

Referring to FIG. 7, if Dog 121 and Excitement 122 are both firing (e.g., information inferred from a parsed sentence), references to them are placed into context pool 10. The relationships of FIG. 7 would set expectations for a dog to bark via neuron 123. Weights 124, which may differ from each other, are multiplied by the firing levels of 121 and 122, respectively. If the resultant firings both exceed some minimum decision threshold, the AND operation 125 causes the generic Dog-Bark neuron 123 to fire. A reference to neuron 123 would then be inserted in the context pool, possibly initiating a motor skill event to cause a bark, for example. It should be obvious to one skilled in the art that many variations of FIG. 7 are possible without altering the means of this invention.

Again, the analyzer 10 causes any neuron not reaffirmed or re-fired over time to gradually decrease its firing level. That neuron is then ejected from the context pool if it goes to zero. It is also dumped from memory if it is still firing but has been there a long time and the context pool is full.

The Long-Term and Reinforcement Memories. Reinforcement memory is a way-point in the process of learning and remembering things. All new information and relationships are established in reinforcement memory, and it serves as a filter for items important enough for later recall. Analyzer 30 handles this process.

The reinforcement memory 11 is a means of eliminating non-essential facts, relationships and incidents otherwise uselessly cluttering permanent memory. The ultimate growth of long-term memory 12 is then moderated, keeping the mental processes and memory more efficient.

Much of the information and experience we encounter is incidental and not worth recollection. For example, paper blowing in the wind is recognized for what it is, but the incident is too insignificant to remember, unless perhaps the context is the distribution of propaganda leaflets. The latter might be worthwhile musing over. Reinforcement memory 11 is the interim repository for this information, while its worth is reaffirmed or forgotten. Analyzer 30 permanently moves validated facts and relationships to long-term memory, as discussed elsewhere.

The long-term memory 12 and the reinforcement memory 11 share a more or less common format. Allocation of neurons and relationals are handled entirely by analyzer 30, and policies that govern permanent retention reside there.

Figure 8:
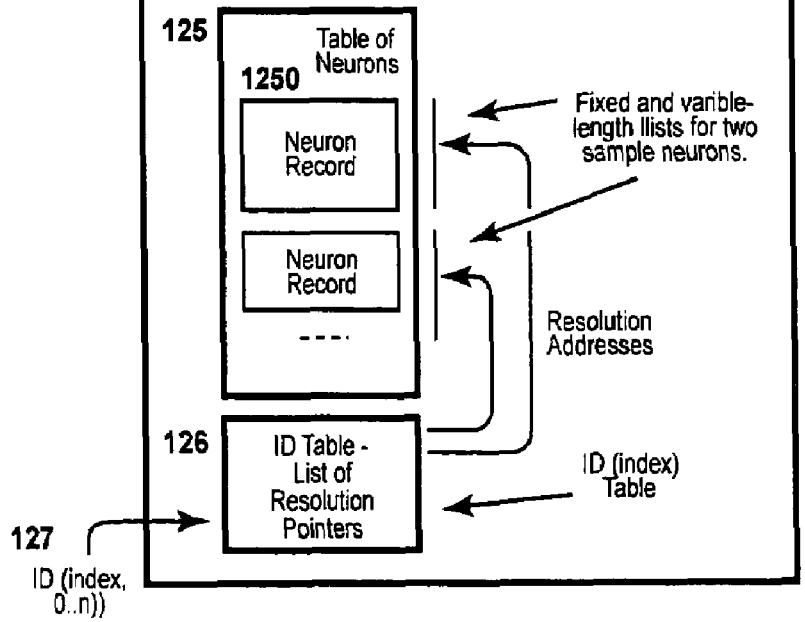
FIG. 8 illustrates Organization of Neuron Tables—General organization of neuron memory lists.

Information is validated by analyzer 30 as 'memorable' when was repeatedly referenced over a 21-day period, or repeatedly during exercise of strong emotion or trauma. So validated, the analyzer 30 moves it to long-term memory 12. Referring to FIG. 8, associated relationals are also moved from reinforcement memory 11 to the long-term side. Both memories consist of the following items:

An ID Table 126
A Table of Neurons 125
Other emulator-specific tables

"Other" tables include specialty tables associated with a single neuron and used for recall of motor-skill task lists, aural or visual artifacts or objects, and the like. Their format is specific to the emulator type (e.g., visual, speech or motor-skill) that produces them, but they follow the standard processing and correlation rules for ordinary neurons.

No neuron is special of itself. Rather, it takes meaning and worth from position and interconnection with other neurons. For example, a Laptop neuron is meaningless of itself (except for spelling, pronunciation and visual shape), but has importance because of its relationships to Computer, Portable, and Convenient.

The following sections discuss one specific implementation of emulator structure. One skilled in the art will realize that the technology of implementation is secondary to the means described herein. Many of these items will be tweaked or implemented variously as the underlying technology of implementations varies, such as software emulation, FPGA, gate array, embedded processor, analog relational arrays or optical logic.

The ID Table. Referring to FIG. 8, every neuron is assigned a serial number 127, something of no significance in itself. Each relational connection to another neuron uses that unchanging serial number as an ID. From the ID, spelling, pronunciation and other relevant information is obtained.

When memory is implemented as digital memory, the ID table 126 is located preferably at the base of that memory and consumes a predetermined and finite logical space. It is sized to have one element for every possible neuron. In reality, memory can be resized as more is made physically available, with suitable offsets applied to the resolution value for each ID in the table 126. For each index 127, the corresponding offset into the ID table 126 contains a neuron's address in the neuron table 125.

A vocabulary of 30,000 words is an acceptable working size when words alone are considered. For some people, up to 300,000 unique words are known. Each concept, e.g., "off the wall" to be remembered has its own index, as do words, remembered events or conditions; each corresponds to a unique neuron record 1250 in the neuron table 125.

Experiences may or may not have their own index, depending on what they are and how they were formed. It is therefore realistic to have an index table 126 of 8-20 million items or more, for example.

Table of Neurons. Referring to FIG. 9, neurons 1250 are emulated by fixed-size information block 1251, and a variable number of relational connection records 1252. The latter may be conditional, predicated upon the state of other neurons. They may reference the ID indices 127 of both their target and conditional neurons. With better-suited hardware memory technology available, such as capable of directly forming relational linkages between neurons, these technology-dependent linkage-pointer structures may be superfluous and may be eliminated or replaced.

Basic information 1251 may include references to explicit spellings (e.g., a walk-back index to the text-tree for the word), pronunciation exceptions, visual-object descriptors and the like. Certain flags and start-indices for lexical matters and the like are also included here.

The relational 1252 is a link between two neurons. It may also be a link between a neuron and a state parameter. Relationals may be unidirectional or bidirectional in nature, and may be performed only if a specified set of conditions are met. Relationals are loosely suggested by the biological neural dendron.

When implemented in digital memory, it is convenient that relationals are allocated in the space immediately behind the fixed-length portion of a neuron record 1251. Normally there a blank space is reserved there in anticipation of relational records insertions. Before inserting a new relational, analyzer 30 checks for sufficient room and reallocates the entire neuron with greater space, if not.

The length of the relational detail block 1252 is variable, depending upon the type and number of relational connections made to other neurons. It not unreasonable that total (digital) memory may consume 16 megabytes to 2 or 3 gigabytes.

Relationals 1252 have an AND-OR organization. AND-connected relational records are grouped together following the fixed-length portion of the neuron.

Referring to FIG. 10, a specific target ID 1256 is generically defined to represent the OR condition, with the remainder of that 'relational' record ignored. As stated elsewhere in this discussion, certain neuron IDs are reserved for such special purposes as this. Similarly, certain values of the weight 1257 are reserved to indicate an INHIBIT condition, and the weights themselves may be negative, to reduce the level of recognition, the firing level.

By itself, the relational 1253 is unidirectional. The neuron 1250 it is a part of is fired to the degree that the neuron referenced by target ID 1256 fires. However, the firing of this neuron 1250 does not otherwise affect the target ID 1256. For example, Grass may imply Green, but Green does not imply Grass.

For conditions in which a relationship is bidirectional, analyzer 30 creates a suitable relational for each of the two neurons, each pointing back to the other. This is akin in software to a doubly-linked list.

The weighted and conditional influence of this neuron upon another is defined by relational linkages 1252, of which there may be up to 1000 or more for some neurons. Each new experience and relationship that is learned has a new relational linkage created for it. The garbage collection and management of neuron-relational memory spaces is discussed elsewhere in this patent.

Initially, new neurons 1250 and relationships are created in the reinforcement memory, where they remain until later validated and moved to long-term memory, or are deleted. Relationals 1252 in reinforcement memory may refer to neurons in either memory, but those in long-term memory may refer only to other neurons in long-term memory 12. Analyzer 30 tracks allocation, aging, validation, and 'garbage-collection' processes, as discussed in detail elsewhere.

Other Tables. Besides pure neurons or relationals 1250, both reinforcement and long-term memories may hold other encapsulated information. These data blocks are treated and referenced as ordinary neurons, but contain extended structures for efficient later recall of compound and complex entities. Details of each of these are discussed with the description of their relevant neurons.

The neuron process for recognition of sight and sound is by reconstructive correlation, matching a reference image, or sound against a known object or sound. Memory storage is 'reconstructive' in that actual sampled sounds or pixilated images are not stored. Rather, sufficient information to reconstruct a reference object (for comparison purposes) is remembered. Stored images and sounds then consist of lists of object artifacts rather than detailed information on them. The degree of match or similarity determines the neuron's firing level.

Refer to Table 8 for a list of some common supporting tables. The list is by no means complete, and one skilled in the art will realize that there are many ways to organize such information into tables without altering the means of this invention.

Recognition and re-creation of visual objects are different processes, and must be optimized separately. Biological function suggests that humans do not store detail, such as a bitmap image. Yet, they can certainly recognize a detailed object, and can accurately identify it when exposed to it. A correlation template is recreated from the stored table information and applied to the appropriate correlator. This may be, for example, a vector skeleton for use by the visual correlator for image identification. The neuron fires in proportion to the degree of match.

Event Queue and Memory 14. Events are special-purpose commands issued to a queue 14. They are slated for later execution at a specific time, after a specified delay or after a specified set of conditions are met. They are the means by which unwanted looping over information in the context pool memory 10 is circumvented.

An event is simply a marker or flag set down to remind the system to do something when a specified condition is met. It greatly simplifies the handling of actions that are asynchronous with each other. When the analyzer 30 discovers new information in the context pool 10, it may issue one or more events to the event pool 14. For example, the analyzer may create an event that adds new reference back into the context pool. It could also issue a conditional event to later force the analyzer itself to iteratively rescan the context pool, such as may be done for an analytical temperament such as the Melancholy.

The same mechanism is also used for establishing conditional relationships between neurons, or between neurons and state parameters. Events can be generated by the alteration of state parameters 22. By issuing events for future execution, the analyzer 30 avoids getting side-tracked from the task at hand being worked.

Figure 11:
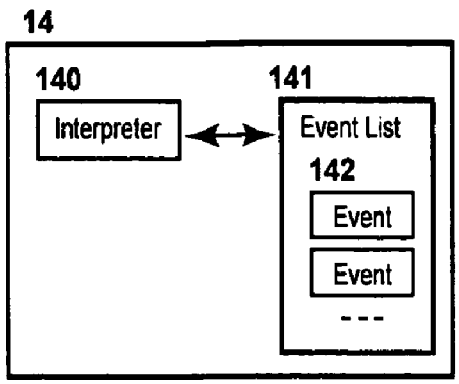
FIG. 11 illustrates Event Queue and Memory—Organization of the event processor.
Figure 12:
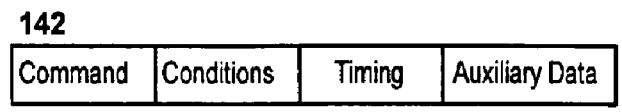
FIG. 12 illustrates Content of an Event—General internal contents of an event record.

Referring to FIG. 11 and FIG. 4, the event queue 14 consists of an interpreter 140 and an event list 141. Creation of an event causes an event 142 to be inserted in the event list. Events 142 in the list consist of a command field and other optional fields shown in FIG. 12. The interpreter repeatedly scans the event list for events that can be processed. Whether or not they can be processed is determined by the conditions

TABLE 8

List of Some Common Supporting Tables

| Table | Description |
| --- | --- |
| Task Lists (e.g., Motor Skills | These are lists of actions to be taken, to carry out repetitive or learned tasks. They are specific to supporting emulators, such as those that handle motor skills or musical abilities. Task lists are usually coupled tightly to sensory processes, and can be started, interrupted or stopped by the main brain model. |
| Aural Artifacts | These are descriptors of basic sounds, including such things as phonemes, ADSR rules and the like. They are not complete words or sounds. |
| Aural Interpretive Rules | This is a list-like set of rules for the interpretation of spoken speech, and augments the algorithmic-based lingual processes. |
| Visual Artifacts | This is an arbitrary set of visual elements used to recognize more complex objects. The artifacts may include lines at various angles, facial and nose shapes, alphabetic outlines, and the like. They are elements used for the reconstruction of visual images, of the minimum detail needed to perform image correlation matching. |
| Visual Objects | These are descriptions of complete visual objects, but of minimal detail needed to recognize them. For example, to recognize a specific face, only a portion of the eyes, nose and chin or cheekbone may be required. This reconstruction object is connected to the neuron for a specific person, for example, attaching the face to its identity. The connection is done via bidirectional conditional link. | and timing fields. The auxiliary data field, if present, contains information unique to the event type. Once an event has been processed, it is removed from the event queue.

After interpreter 140 has scanned to the end of event list 141, it restarts scanning at the beginning. If no events are left to process, it awaits the creation of a new event. One skilled in the art will realize that the event queue 14 can be implemented as hard-coded logic, as a micro-coded processor, a software emulation, an embedded processor, FPGA, ASIC, optical or other technology of choice, without altering the means of this invention.

Conjector 70. Conjector 70 proposes decisions based upon incomplete or partial facts, or facts of low confidence. While the analyzer 30 is the main thinking facility for the emulator, it takes advice and proposals from both the conjector and dreamer 75 blocks. Proposals from the conjector are filtered by clutter filter 40 on the basis of temperament and personality.

During the processing of sentence data in the context pool, analyzer/correlator 30 acts on the sentence block to determine a suitable course of action where appropriate. If it 'comes up dry', the analyzer invokes the conjector suggest a valid meaning. If the resulting quality of the conjector output is too low, analyzer 30 may direct the communications interface 98 to ask for clarification. It sets an appropriate parameter flags to await an answer to the question of clarification.

Conjector output is similar to any normal neuron reference or sensory nerve that is firing at a relatively low level for the topic. Other than being flagged as coming from the conjector, output of conjector 70 is essentially identical to data inferred from sentences by semantic analyzer 50.

The conjector behaves in a similar manner to the analyzer 30, except that it only looks at material in the present context pool. It is not bound by the same needs for hard facts as the analyzer is, and effectively offers subjective information for consideration. Its proposals are largely ignored by the analyzer, except for cases such as the following:

Information is missing or incomplete.

Questions posed by the analyzer through the communications interface 98 are yet unanswered within the expected interval.

Overall level of confidence (firing) levels of information in the context pool 10 is low. In effect, when answers are not available to the analyzer 30 from existing information, the analyzer turns to the conjector to fill in the blanks.

For its operation, conjector 70 reviews outstanding questions or issues, as defined both in the context pool, supporting tables and appropriate state parameters 23. Some state parameters track the present topical subject(s), questions being asked, and information presently being sought by analyzer 30. On the basis of this material, it scans even low-firing neuron references and commands within the context pool 10 and proposes (conjectures) answers for the analyzer.

Respect by analyzer 30 for conjecture is implied by the weighting placed on it. Proposals are ignored if they conflict with other information, or if better (stronger firing) information becomes available. Conjectures age rapidly and are soon forgotten from the context pool, whether or not acted upon. The analyzer considers the source of the conjector's 'information' and its levels of confidence (firing levels). It then establishes its own need for the proposal, and its own level of confidence in the data. Rejected conjecture is immediately deleted.

One skilled in the art will realize that conjector 70 can be implemented as hard-coded logic, as a micro-coded processor, a software emulation, an embedded processor, FPGA, ASIC, optical or other technology of choice without altering the means of this invention.

Dreamer 75. Dreamer 75 functions as the 'right side' in the brain emulation of this invention. It peruses neuron references in context pool 10 and uses different weightings for state parameters than used by analyzer 30 for its inputs and decision processes.

The dreamer influences the analyzer primarily by injecting fired neuron references into the context pool, rather than just structured commands such as from the semantic analyzer 50. Where pre-existing information in the context pool comes from visual or aural sources 60, or from visual neuron correlations, the dreamer may output proposals in the form of command blocks.

Similarly to correlator-analyzer 30's processing methods, the dreamer generates new references and commands based upon existing neuron firings. However, when traversing the neuron relational chains, lower regard is given to relational conditions 1252, as in FIG. 9. The resulting outputs are of low reliability, as indicated by both their source and its firing levels. When analyzer 30 is otherwise inactive or is in sleep mode, the dreamer may indirectly alter the subject topics by issuing events to event queue 14. Due to the 'noise' levels involved, the dreamer may rapidly flit from topic to topic. The dreamer also remains active when the brain emulation is otherwise in a 'sleep' mode.

When subsequently processing context-pool data created by the dreamer, analyzer 30 does not create new neurons or relationals in the reinforcement memory 11. Upon awakening from sleep mode, the analyzer 30 also rapidly purges residual dreamer-generated 'information' remaining in the context pool.

The dreamer therefore behaves as a 'movie-maker' of sorts, unconstrained by relational logic. It creates new ideas loosely based on the context of the moment, ideas that also have very rapid lifetime decays. While this firing of neurons is not in a logical or cohesive way, it still influences decisions and analyses made by the analyzer.

Dreamer 75 is algorithmically based, statistically ignoring strong-firing neurons and applying logarithmic weighting to firing neurons as a part of its own processes. In this way, dreamer peruses the context pool, effectively giving weight to neurons barely firing.

The impact of the additional neuron firings in context pool 10 is that the dreamer places greater overall weight on neurons than the analyzer would have. During the course of activity, the firing of some neurons will be enhanced because of the multiple references to those neurons. Analyzer 30 appropriately weights information flagged as coming from the dreamer, and continues to apply its normal logic to the data. Where it is seeking new ideas, it will weight dreamer-induced references higher than it ordinarily would.

Because dreamer 75 operates at lower effective thresholds than useful for analyzer 30, it is more prone to 'noise' and error than is the analyzer. While its outputs are less reliable insofar as decisions go, its purpose is different. During non-sleep operations, dreamer pseudo-information passes through clutter filter 40 where it may be rejected by the personality and temperament filters. During non-sleep operations, the clutter filter rejects more dreamer output by altering rejection filter thresholds.

One skilled in the art will realize that dreamer 75 can be implemented as hard-coded logic, as a micro-coded processor, a software emulation, an embedded processor, FPGA, ASIC, optical or other technology of choice, without altering the means of this invention.

Speech and Visual Analyzers 60. The emulated brain of the present invention may be applied to a mechanical system, whether a skeleton or vehicle, and list-based motor skill learning functions are used. Interfaces from task list handler 13, event handler 14 or analyzer/correlator 30 can be used to control external hardware. These interfaces can be used to apply specific levels of force, when used with closed-loop feedback, or a specific mechanical position, with or without feedback.

Sensors used for the feedback systems are determined by the application. For example, placing one's hand on a table requires either a priori knowledge of the table height and position, or requires feedback such as derived from the eyes. Suitable sensors might be a pressure sensor for the nose (so one don't bump into a wall more than once) or for the hand. Aural sensors provide feedback to ascertain the proper formation of sounds, such as to sing on key with existing music.

The methods of this invention create correlation templates or proposals, visual or aural objects presented for correlation against visual images or sounds. Binary search methods are used to select the proper template for correlation, to rapidly determine degrees of recognition. The correlation method constitutes a processed sensor, a sensor with internal ability to ascertain degrees of recognition.

Non-processed sensors are simple temperature, pressure, humidity or light intensity measurement devices, whose outputs are simply formatted appropriately for input to an interface. Processed sensors require interpretation and possible correlation before they can develop meaningful signals. For example, using any number of algorithms, a visual sensor takes a template image and returns the degree of correlation in the present image. Similarly, processed aural sensors take a prototype, such as for a phoneme, and return the present degree of correlation. Phoneme variations may be proposed if a matching word has its neuron firing in context pool 10.

Speech and visual analyzers 60 use task list or other memory such as 13 to retrieve the next sequential image templates for correlation as proposed by analyzer 30. These are conveyed as present settings of the relevant state parameters. For example, some motor skills demand visual feedback for the recognition of a table, its upper surface position, and the position of that portion of the hand to be placed there. These separate objects that must be recognized in turn by the visual correlation processes.

When the table top has been identified, its position must be reported to the context pool 10, as is the position of a suitable landing site on it, the proper area prescribed by the analyzer 30's intention and desire. The outputs of visual correlation are conveniently made relative to the location of the skeleton's eyes, such that correction for hand motion can be made.

Particularly for the visual recognition processes, motor skills require feedback for position, rate of travel, distance and the like. From a single sensor (e.g., a pair of camera 'eyes'), multiple streams of feedback can be derived, with the information forwarded as command or event packets to context pool 10.

Visual and aural cues aid in confirmation of recognition, delivering feedback for required motion control. These are needed, for example, to rotate and tilt the head properly and to then direct the eye yaw and tilt so the detailed center of the foviated vision is centered on the portion of the scene of interest. These matters are handled interdependently by list processor 13 and visual/aural analyzer 60.

The speech analyzer 60 dumps its output into the semantic analyzer 50 to actually parse spoken material into items suitable for the context pool 10 memory.

Obviously, many technologies for such processed sensors exist, as known by one skilled in the art. The present invention permits interactive presentation of template information with the sensor, in concert with the functions of this brain emulation. One skilled in the art will realize that visual analyzer 60 itself can be implemented as hard-coded logic, as a microcoded processor, a software emulation, an embedded processor, FPGA, ASIC, optical or other technology of choice, without altering the means of this invention.

Memory Garbage Cleanup and Collection. Garbage collection refers to the reclaiming of unused fragments of memory. During this process, the fragments are sought out and objects in surrounding memory are moved up or down, coalescing unused fragments into a larger block. Coalesced blocks are remembered for later reuse.

Cleanup is a catch-all phrase to cover all things that need to be done to the memory to optimize it. As noted below, it is used to resize certain areas of memory to optimize usage, reclaiming previously reserved space that could better be used elsewhere.

Memory garbage collection and cleanup processes usually involve the movement of information in memory, with suitable updates to indices and pointers to properly reflect the movement.

Expansion of Relational Linkage Blocks. When a neuron originally assigned and given an ID by analyzer 30, empty area for the relationals 1252 is reserved behind the basic neuron information block 1251. Refer to FIG. 9 and FIG. 10. As new relationships are formed, relational records 1253 are appended to the end of the above linkage list. Eventually, this free space is exhausted, and there is no room to add the relational, between the end of the present linkage block and the start of the next neuron. Something must be explicitly done to fix this.

'Sleep-Time' Cleanup Activity. Sleep is used to remove clutter from short-term memory, half-formed fragments of thoughts, conjectures, and certain other items of information. This process enables the next day to start out fresh, just as with a human. It is a suitable low-risk time to perform optimization of memory. During periods of 'sleep', the inactive state of the brain emulator can be used to advantage to handle movement of validated facts from reinforcement to long-term memory. This process leaves unused holes in reinforcement memory 11, which are also cleaned up.

During the reallocation of the neuron in long-term memory, or when moving a relational from reinforcement memory 11 over to the associated neuron in long-term memory 12, it is possible there is no room left for the relational. For this reason, a neuron's space in long-term 12 must sometimes be expanded.

For this, reinforcement memory 11 is scanned to determine what neurons are eligible for transfer. If transfer would be impeded by lack of space, the associated long-term neuron memory record 1251 is resized upwards.

When available reinforcement or long-term memory has diminished below threshold, neuron space can also be resized downwards during 'sleep' times, to optimize it. Neurons 1251 with significant free space behind them can have some of that space reclaimed. Heuristics determine whether or not to downsize. Sparse separation of neurons in memory is always faster, so reclamation is only done if required.

Incoming information 93. The implementation of deference between two modeled individuals takes place in analyzer 30. The position of the present individual being modeled within a hierarchy of individual, political or institutional structures is also kept in parameters 23.

All information except that from the analyzer/correlator 30 first passes through the clutter filter 40, where it may simply be ignored and scrapped. Clutter filter 40 uses personality-specific parameters 22 to determine whether the composite personality is even interested in addressing the information, which has been pre-classified. For example, a Choleric temperament is likely to completely ignore human-interest information, whereas a Sanguine temperament readily devours it.

The filter 40 is a catch-all area to pass preliminary judgment on data, including judgment of its source. The filter is controlled by a number of dynamically-changing parameters, including the current state of patience. When context pool 10 is full, filter 40 drops information, bio-mimetic to someone in the state of "mental overload."

Preemptive Training. The brain emulation of this invention learns over time, influenced by underlying temperament. Normal human learning processes are used by the emulated brain. Nothing is retained in permanent memory 12 by the analyzer 30 unless it has been reinforced for approximately 21 days, avoiding an accumulation of 'clutter' facts and relationships. Facts learned are normally interpreted under the influence of the root temperament, which has its implicit filters and analytical processes (or limited analytical processes, as in the case of the Sanguine).

The brain emulation may be 'trained' by a method preempting normal temperament-and-time processes, to rapidly absorb facts, control and environmental conditions. The process is therefore described here as preemptive training. It is assumed in this case that the 'facts' and relationships presented are previously determined to be true and factual, "from God," as it were.

Preemptive training may be turned on or off at will, externally to the emulator. It can be turned on to affect rapid training of these pristine facts and relationships, bypassing temperament-related decision steps and levels of analyzer 30 and clutter filter 40. In this training mode, access is given to state parameters and controls not otherwise permitted. When training is completed, these may be returned on. The modified parameters then immediately effect the personality.

When in preemptive training ('setup') mode, the entire contents of memories, one or all, and selected or all state parameters may be copied to external storage. This has application for both the commercial marketing of the information as "intellectual property", and for military purposes as discussed elsewhere. Such 'snapshot of being' may be replicated elsewhere and used as the basis for additional training.

Facts and Relationals. Under preemptive training, new facts and preliminary relationships between them can be defined using declarative monolog in a text file, or a verbal narrative if a speech analyzer 60 is present. These are described in English prose format. The grammar is interpreted by the English Parser, but it is not filtered or further interpreted by analyzer 30 or conjector 70. Normal processes for grammar interpretation are followed, but the information undergoes no further temperament-based interpretation or filtering. This approach lets the brain emulation query the trainer for information that is unclear or not understood, and the training process becomes similar that of a knowledge-hungry human being.

Religious Belief and Personal Conviction. Religious beliefs and personal convictions may be established by preemptive training. As with all preemptive training, the brain emulation will have no idea of why it has these beliefs or convictions. Even so, they can be overridden by deep (extended and consistent) normal training, thereafter.

The beliefs are set by a prose-style description in a text file, to be read by the brain emulation. If it does not understand something or considers something illogical, it will ask for clarification by the trainer. The prose can subsequently be altered to preclude that question for the future.

There is nothing fundamentally different in the matter of religious belief and personal conviction over other types of facts 1251 and relationships 1252 that may be learned. However, by defining them under preemptive training, the normal analytical checks by the analyzer 30 for consistency and factual basis are bypassed, making them an integral part of the emulated brain's basis of understanding. Religious beliefs or personal convictions are established they could also be trained (non-preemptively) over extended time.

Specification of Control Parameter Values. The many control parameters 23 and their default values may also be preset by preemptive training. This can also include specific emotional responses to be evoked when defined conditions are met. The result is again that the brain emulation does not know why (he) responds that way, but he simply does. This is useful to preset human-like likes and dislikes for specific things, for accurate emulation of a person.

Preemptive training is the method by which the temperament of the brain emulation is specified, including both the base temperament type and the upper-level composite of temperaments. These settings will directly affect the outcome of responses and decisions made by this emulation.

The time frame over which the brain emulation learning reinforcement occurs is nominally 21 days, but defaults to somewhat different durations on a temperament-dependent basis. Table 9 gives some representative default reinforcement intervals. 'Permanent' learning also takes place during times of emotional stress or trauma, during which the interval of this table is proportionately decreased.

TABLE 9

Temperamental Learning-Reinforcement Intervals

| Temperament | Duration |
|---|---|
| Choleric | 21 days |
| Sanguine | 18 days |
| Phlegmatic | 15 days |
| Melancholy | 21 days |

When the time is reduced (it does not effect preemptive training), the brain emulation is more likely to retain trivia and insignificant information. After the emulation is turned operational, those presets become an intrinsic part of its responses. They define the settings from the present time onward, until altered.

While in preemptive training mode, memories 11, 12, and 13 and other tables may be saved to external storage, upon command. This includes facts and relationals 1251 and 1252, and relevant parameter settings 22 and 20, and their defaults. In short, anything trained can be restored to the memory it came from. One skilled in the art will realize that the methods of saving memory and parameter states are dependent upon the technology of implementation, and that variations in these methods do not materially alter the system of the present disclosure.

When using a brain emulation of this invention to model a specific person (e.g., a foreign national for military purposes), the emulation's memory and parameter settings can be "snap-shotted" to enable a simulation re-run under new conditions or parameter settings. Anything learned between the snapshot and the time of their later reloading is lost and may not be incrementally recovered and reapplied, unless it was also snap-shotted.

Figure 13:
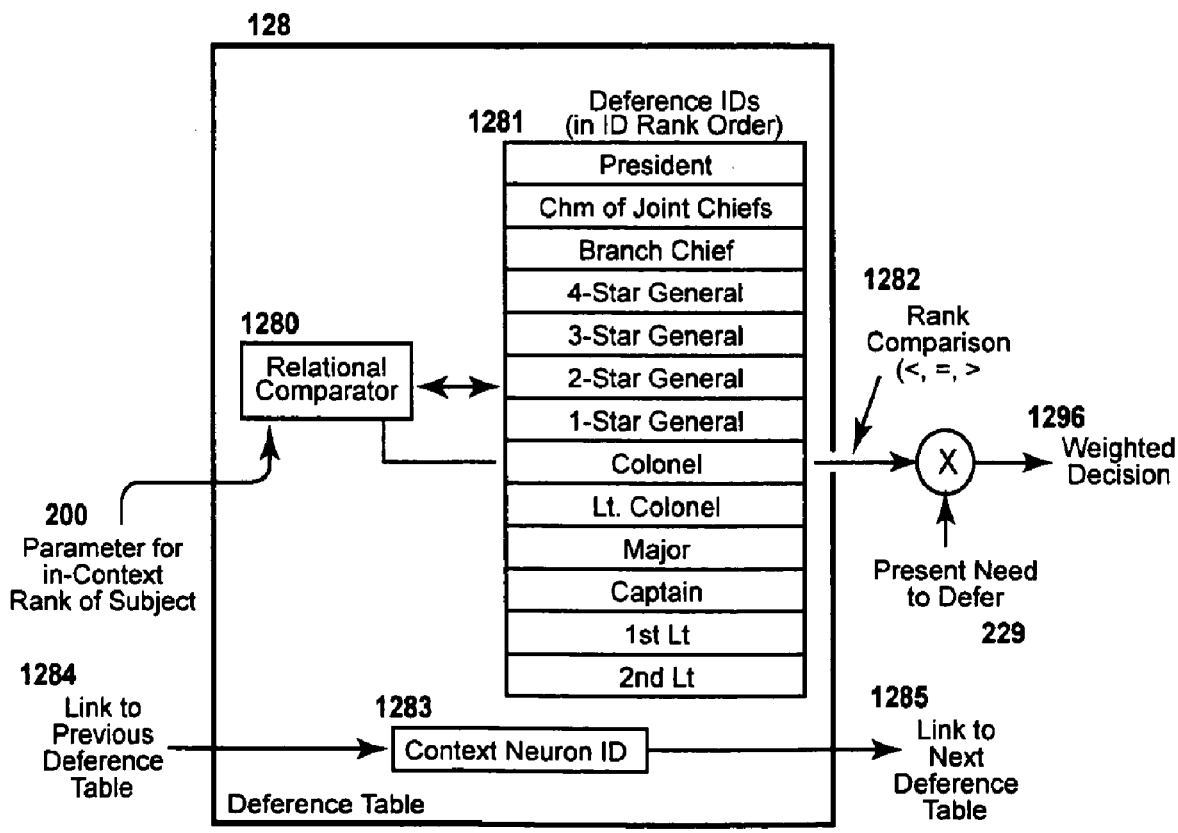
FIG. 13 illustrates A Deference Table—Example table of orders of deference.

Degreed Deference. A concept that plays a necessary role in human relationships is that of deference to another person something. Deference is not 'black-and-white', but exists by degree. Normally the human makes decisions that suit himself under the present conditions, without regard to other people. However, he/she will have particular regard (deference) to some people, such as parents, bosses, military chain of command and the like. The brain emulator uses degreed deference to emulate this implied relationship. Referring to FIG. 13, the Present-Need-to-Defer parameter 229 provides the weighting.

Multiple deference tables 128 may be created in memory 12, that apply in a specific context 1283 (e.g., military, political, social order, class). All deference tables are chained together using the links such 1284 and 1285. The analyzer 30 scans the deference tables to alter a tentative decision, if it conflicts with an external command, such as inferred from an imperative sentence in semantic analyzer 50.

Analyzer 30 seeks a deference table matching one or more active contexts of the moment, as maintained in state parameters 23. Finding one, it specifies the parameter for the rank self-identity. If the subject being measured for deference is another person, that person's ID 200 is used instead. The relational comparator 1280 makes its decision as the deference output 1282. The decision weighting 1296 is further adjusted by the present need to defer 229. Signal 1296 is then used to determine if any decision should be made at all. In this manner, the analyzer 30 defers to commands of authority it is subject to, or weights the decision outcome if the conflicting command was merely a recommendation of external authority.

The deference tables 128 therefore supply a realistic influence by external authority upon the brain emulation. When used in a military environment, for example, a simulation manager in charge of the brain emulator(s) can exert real-time control upon the brain emulations, if the manager's ID is placed at the top of all deference tables.

Preemptive training establishes the set(s) of hierarchical tables 128 for relationships between this emulator and others (or other people). The same prose-style description is used to describe the 'chain of command' and where the current brain emulation fits within it.

Establishing a down-line deference (i.e., a condition where another emulator or person should defer to this brain emulation) is permissible. It sets the emulator's expectations of that other emulator or person. Response to a violation of those expectations is dependent upon the base temperament specified for the present brain emulator, and may also be defined during preemptive training.

The Implementation of Temperament. Certain assumptions made by any such model of human psychological function, including this one, enable or simplify the understanding of brain functions. Properly done, they permit ready creation and implementation of a synthetic brain based on that model. They may be right, wrong or erroneous, but such assumptions permit rapid creation of a 'baseline' implementation. Such assumptions do not effect the overall means of this invention.

Figure 14:
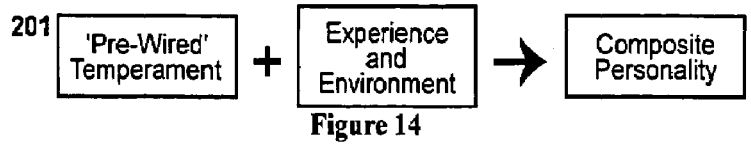
FIG. 14 illustrates The Layered-Temperament Personality.

The FIG. 14 depicts one such assumption, the makeup of composite personality. The assumption is made that each person is 'pre-wired' at birth with a specific set of pre-dispositions, one of four basic types well known to those skilled in the state of the art. These include the Choleric, Melancholy, Sanguine and Phlegmatic temperaments, as categorized and defined among the basic tenants of classical psychology.

To these basic predispositions (temperaments) is added a set of experiences and training, learned from the environment in which the individual lives. The from-birth predispositions are collectively defined as a 'base temperament', as used here. The sum of that temperament and the set of experiences is used by the present invention to define the composite personality.

Figure 2:
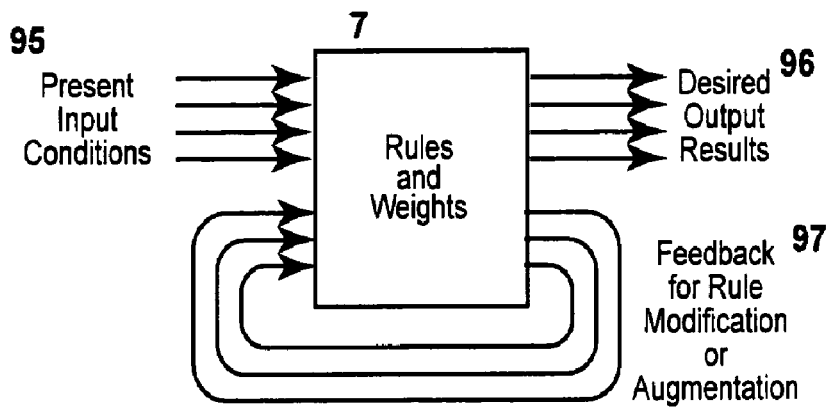
FIG. 2 illustrates Rules-Based Systems (Prior Art)
Figure 15:
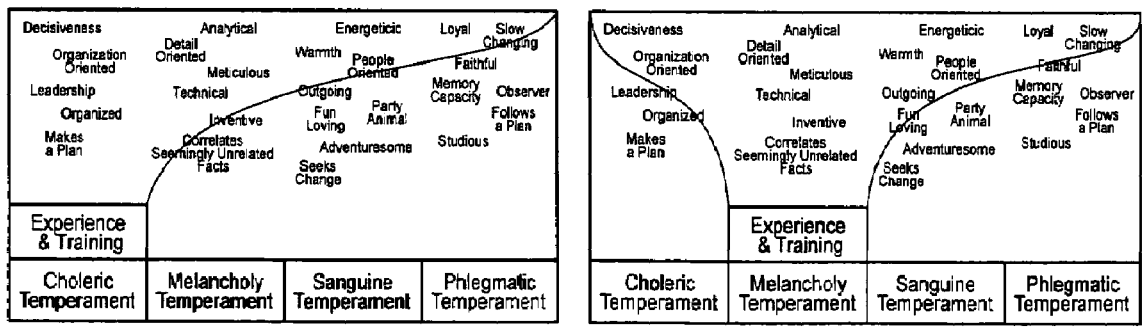
FIG. 15 illustrates Characteristic Traits of the Temperaments.

FIG. 15 depicts another assumption used by the present invention and model, approximate traits exhibited by the four classical temperaments. The above 'pre-wired temperament' 201 of FIG. 2 are replaced by the actual classical temperament names, in FIG. 15 and FIG. 16.

Figure 16:
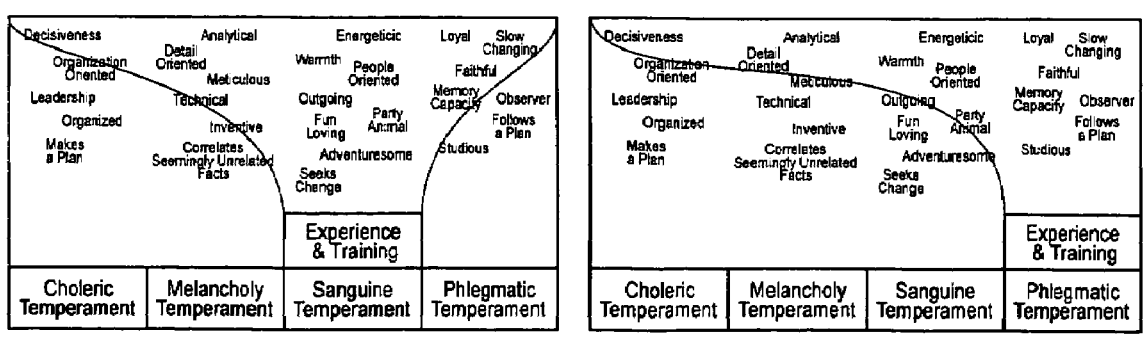
FIG. 16 illustrates The Four Composite Temperament Models.

FIG. 15 illustrates typical traits (largely, but not fully) specific to one temperament type, as indicated above each temperament. FIG. 16 represents the composite personalities of people, each based upon one of the four underlying predisposition temperaments.

Through experience and training, the personality of a given underlying set of predispositions may 'reach out' to intentionally assimilate desirable characteristics of the other three temperaments. The result is a broader composite personality. The individual being modeled here, a Melancholy of FIG. 16b, for example, may embrace decisiveness or leadership traits more characteristic of a Choleric.

Another assumption made here simplifies the understanding of human behavior, and the implementation of this realistic brain emulator. It is that every person has one and only one basic underlying temperament, regardless of past or present experience or training. When placed under emotional or physical trauma, or under extreme pressure, the actions, behavior, interests and decisions made by the person (or emulation) tend to revert to those characteristic of the person's base temperament.

Obviously, other assumptions could instead be made about the origin and development of temperament and personality, ones which may be equally valid. These could be used here instead by way of examples, but do not, however, effect the present invention or its embodiments. The above assumptions provide a vehicle for the description of the present invention, and provide a means for visualizing an otherwise complex matter.

Figure 17:
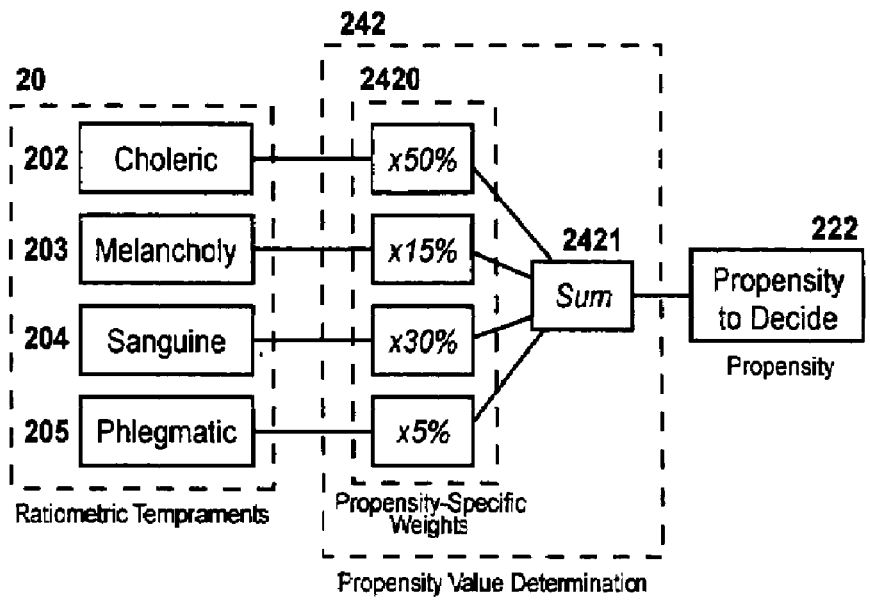
FIG. 17 illustrates Typical Temperament—Weighting of Parameters.

Weighting of Brain Parameters. FIG. 17 depicts the Choleric parameter 202 in its relationship to the Propensity-to-Decide parameter 222, noted earlier. The actual value of parameter 222 is the sum-of-products 2421 of the current values of all four temperament-controlling parameters, each with its own weight. The values of the weights 2420 applied are selected and fixed in the emulation, but the controlling temperament parameters may themselves be adjusted as desired.

It is desirable for one mode of operation that all of the four temperament parameters such as Choleric 202 have values of 0 or 100%, such that they are mutually exclusive. It is desirable for other modes of operation that the percentages of all four temperament parameters may be non-zero, but shall total 100% when summed. An example means to implement this is illustrated in FIG. 17.

It may be convenient, for example to 'synthetically' force the sum of percentages of the four temperament parameters to be 100%. Using weights 2420 given by the example of FIG. 17 the setting of the Propensity to Decide parameter 222 is given by the equation:

$$\text{Propensity to Decide} = 50\%*\text{Choleric} + 30\%\ \text{Sanguine} + 15\%*\text{Melancholy} + 3\%*\text{Phlegmatic}.$$

By ignoring how the 'pseudo-neuron' temperament parameters are set, they may be treated as normal neurons in a neural network.

A useful assumption made by this invention is that human beings (being emulated) have a root, or base, temperament at birth that gives the human certain propensities for behavior. Experience, training and growth may cause the human to take on selective traits found predominately in one or more of the non-baseline ('pre-wired') temperament.

Implementation of Trauma. A part of this invention is the implementation of the human response to emotional pressure or to physical or emotional trauma. Such response is modeled here, for example, as the reduction of impact of such experience, training and growth, such that the personality temporarily is dominated by the 'pre-wired' temperament. This is depicted in FIG. 18.

Figure 18:
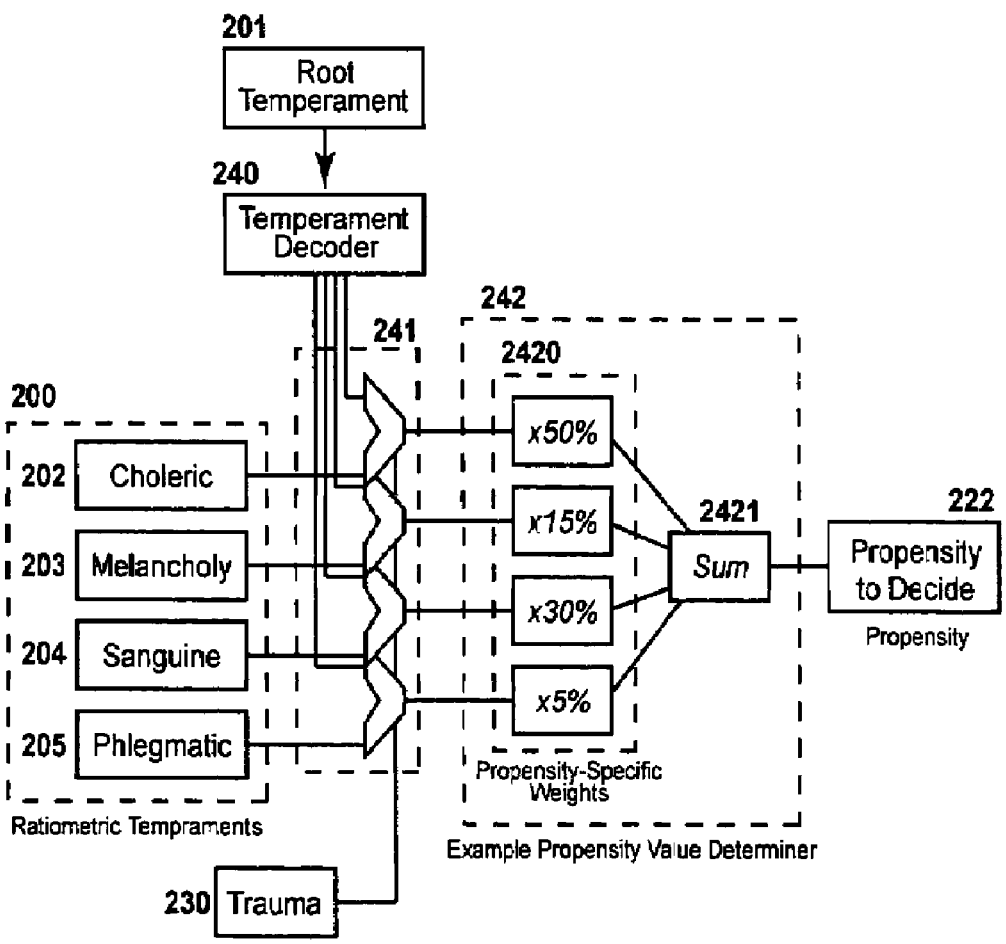
FIG. 18 illustrates Implementation of Pressure or Trauma.

In FIG. 18, the elements of FIG. 17 are augmented by a selector 241, which takes as its output either of its two inputs, one or the other in its entirety, or a percentage of each input as selected by a determining control input. In this case, the normal operation and description depicted by FIG. 4 is altered under emotional or physical trauma or extreme pressure, as noted by parameter 230.

In this case, selector 241 is interposed between temperament sum 2421 and the Propensity to Decide parameter 222, such that when under trauma, that decision behavior is instead determined by the 'pre-wired' root temperament 201. The base temperament is pre-chosen as one of the operational set-up values for the brain emulation and is presumably unchanged for 'life', although nothing prevents such change.

Trauma parameter 230 is triggered and set by sensing other parameter or neuron conditions that indicate levels of extreme emotional pressure or trauma, or physical trauma or shock, for example, trauma 230 is configured to automatically decay with time, using a linear, logarithmic rate or other rate to its nominal 'off' (unperturbed) state or value. It is normally triggered by a change of the above conditions and can be re-triggered if the condition is sustained or recurs, and can be designed to decay immediately if the condition is removed.

The conditions triggering Trauma parameter 230 are not depicted in FIG. 18, but are presumed to exist, and consist of a sum-of-products of parameters and brain nodes from whose values the trauma can be sensed.

Handling of Gender. The basic methods of FIG. 18 are extended to differences of activity between male and female people. For this case, processing flow is augmented with additional multiplexor and weighting tables such as 241 and 242. These would be driven by the Gender parameter 209, instead of Trauma 230, for example. Where appropriate in the decision and thought processes, these additions are incorporated to account for gender-related processing differences.

Figure 19:
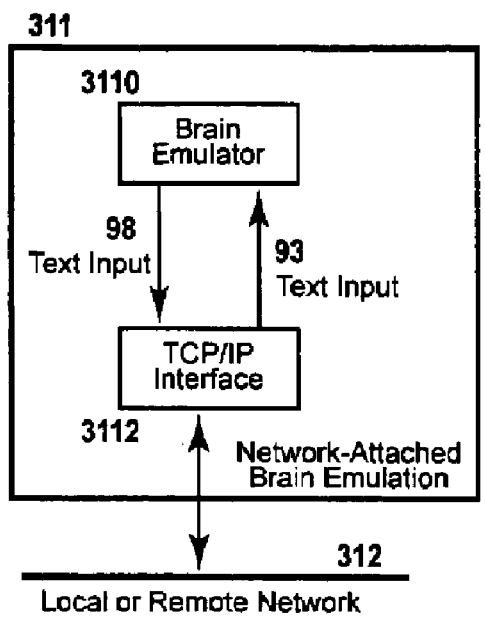
FIG. 19 illustrates Network-Connected Brain Emulation.
Figure 20:
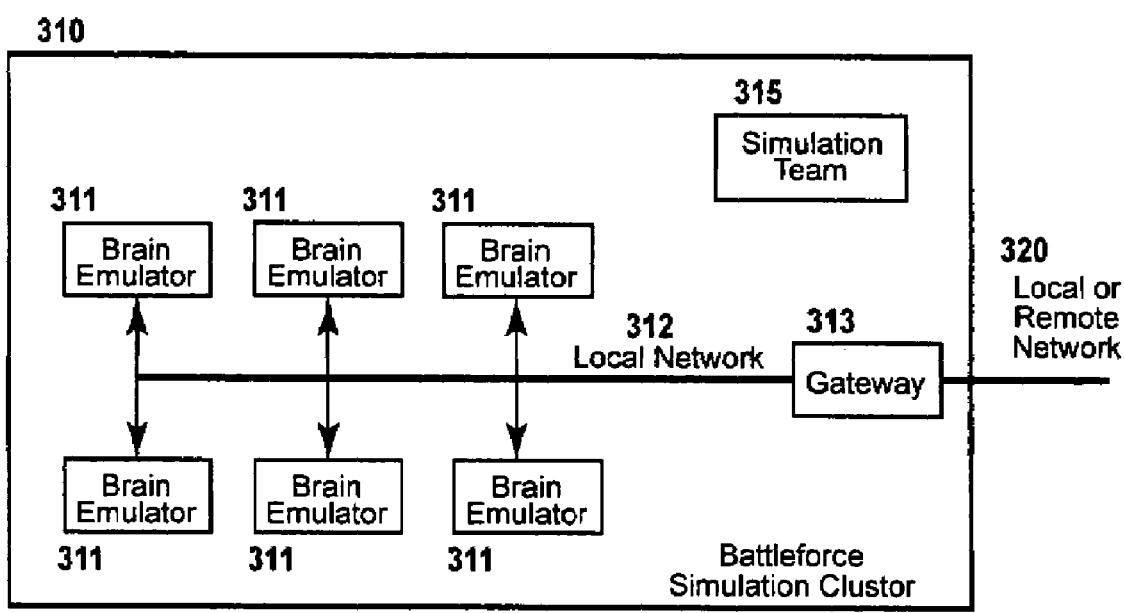
FIG. 20 illustrates Example Battleforce Simulation Cluster.

Use in Military or Political Simulations. Because this invention is capable of accurately emulating human behavior, the brain emulation finds use in many military applications. Using prior means, it is difficult to obtain accurate predictive modeling of combat force decisions, particularly those motivated by religious belief systems and belligerent political ideologies. In the present environment of asymmetric warfare, the ability to forecast combatant decisions becomes critically more important. The means of the present invention provide this capability. Refer to FIG. 19 and FIG. 20.

Brain emulator 311 as described previously can be configured to receive 'verbal' input in the form of a text stream 93 and to emit conversational output text 98. By the addition of a TCP/IP interface 3112, or other interface such as for the 1553 bus, the brain emulation 3110 can be network-connected to a local or remote network 312. It becomes a network-connected brain emulation 311. It should be evident to one skilled in the art that many variations of interface 3112 are possible without changing the system of the present disclosure It is now possible to configure a cluster of these emulators together to form a team. In FIG. 20, these are demonstrated as a Battleforce simulation cluster 310, such as may be used to predictively model combatant forces. The same configuration can also be applied, for example, in an Unmanned Arial Vehicle (UAV) 'cockpit' to emulate a conventional flight crew, each individual specifically trained on for his task role within the crew. It can likewise be applied to an unmanned underwater vehicle, to make autonomous mission decisions when disconnected from the host vessel.

When used as a battleforce simulation cluster, a simulation team 315 of human operators can be assigned to upload intelligence to emulators 311 to accurate emulate key individuals in the modeled battleforce. As new information becomes available on the modeled combatants, preemptive training can be used to update the models.

The emulations 311 used in the simulation cluster can use the port concept of the TCP/IP protocol to restrict conversations among themselves. Such specific local-communications ports can be precluded from access by other such clusters via conventional internet gateway 313. Cluster 310 can then be used to emulate an enemy combatant force (e.g., a 'Red' force), an unknown combatant force, coalition or friendly (e.g., 'White' or 'Blue') forces, secure from each other.

Figure 21:
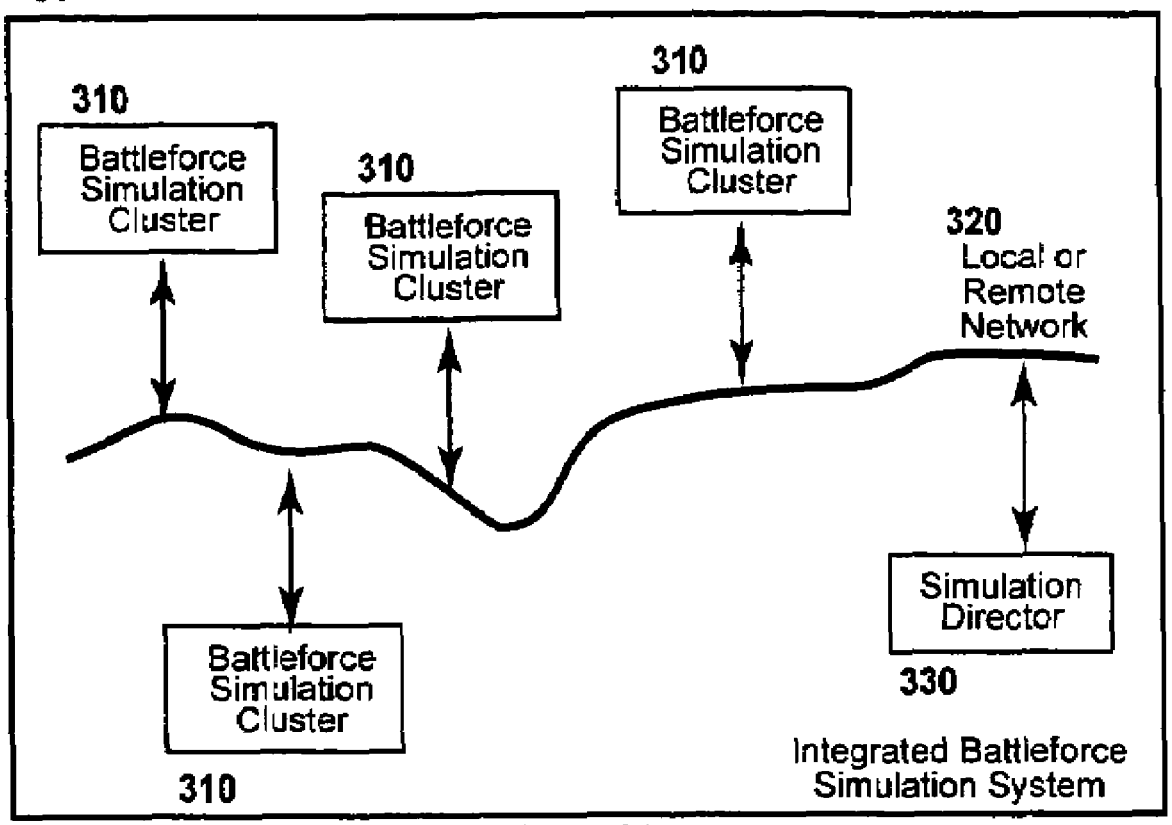
FIG. 21 illustrates Example Integrated Battleforce Simulation System.

Multiple clusters 310 may be interconnected to form an integrated battleforce simulation system 31 as shown in FIG. 21. Simulations would be under the overall direction of a simulation director 330. The director 330 can have secure access to internal conversations within the battleforce clusters 310 by mans of a dedicated encrypted port that gateway 313 replicates and encrypts the local busses 320. This configuration permits independent simulation teams 315 to work independently of each other but under the scenario proposals and directions of the director 330.

The simulation director 330 can remotely take snapshots of the memory and brain parameters of all brain emulations in the system 31. By taking such periodic snapshots, the simulations can be 'rewound' and restarted with different scenarios, intelligence information or updated personality profiles.

Simulation teams 315 may preferably consist of psychologists and people with knowledge about the personalities, governments or composite forces they are responsible for emulating. This invention permits realistic inclusion of religious belief, moral convictions (or lack of them), chains of command and authority, and other relevant personal information required for accurate predictive modeling of people systems.

The simulation system 31 may be located in a local region or may be distributed across the world. Results of such simulations can be made available to the actual warfighters as a part of C4ISR.

SUMMARY. This invention defines a means for a psychological-based emulation of a human being in electronic form, with behavior not easily distinguished from that of a human. It incorporates temperament, emotion, feeling, personality and prior experiences to accurately emulate a human's thought and decision processes. The invention distills factors of temperament, behavior and personality from human psychological behavior as a set of readily-defined parameters. The relationship of these parameters to emotional, though and decision process is then incorporated by the means of this patent into a brain emulation system that can be implemented in hardware (e.g., silicon), and optionally augmented by embedded software.

What is claimed is:

1. A method of emulating human cognition in a brain model containing a plurality of electronically represented neurons, wherein each of the neurons represents a unique concept with relationships to other neurons, comprising:
  providing a context pool memory having a set of references to neurons corresponding to neurons relevant to a present situational context, which neurons, their concepts and associated relationships relate to the present situation context that is defined by information input to the brain model;
  providing a reinforcement memory having a first set of neurons corresponding to experiential relationships, which experiential relationships define relationships associated with neurons that have previously been referenced within the context pool memory and have had relationships established thereto with other neurons referenced in the context pool memory over multiple inputs and situational contexts; and
  providing a long term memory having a second set of neurons corresponding to experiential relationships that have been frequently used when new information is received by the brain model and which experiential relationships have existed in the reinforcement memory, and wherein the long term memory neurons are marked as permanent, never to be deleted;
  wherein the neurons of the reinforcement memory are reflective of the neurons presently or formerly referenced in the context pool, and the neurons of the reinforcement memory are moved to the long term memory based upon continued activity in the reinforcement memory, which continued activity indicates continued activity over multiple inputs at different times and situational contexts, and wherein a neuron cannot simultaneously be in both the first set of neurons and the second set of neurons.

2. The method of claim 1, further comprising providing a list memory containing a set of neurons corresponding to completion of motor skills tasks.

3. The method of claim 1, further comprising copying the contents of the long term memory and reinforcement memory.

4. The method of claim 3, further comprising placing the copied contents of the long term memory and the reinforcement memory into a second brain model having a substantially similar structure to that of the first including a context pool memory, a reinforcement memory, and a long term memory.

5. The method of claim 1, further comprising holding neurons in the reinforcement memory for a predetermined time period to determine a reinforcement of the neuron.

6. The method of claim 5, further comprising selecting at least one neuron based upon a level of a reinforcing activity of the at least one neuron in the reinforcement memory during the predetermined time period and placing the at least one neuron into long term memory.

7. The method of claim 6, wherein the reinforcing activity includes at least one of an emotional event, a stressful event, a traumatic event, and a repeated reference to the at least one neuron over a predetermined period of time.

8. The method of claim 1, further comprising removing a neuron from the context pool when a firing of the neuron falls below a predetermined level.

* * * * *